United States Patent
Yassine

(10) Patent No.: US 11,520,726 B2
(45) Date of Patent: Dec. 6, 2022

(54) HOST CONNECTED COMPUTER NETWORK

(71) Applicant: Graphcore Limited, Bristol (GB)

(72) Inventor: Hachem Yassine, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/305,762

(22) Filed: Jul. 14, 2021

(65) Prior Publication Data

US 2022/0019550 A1 Jan. 20, 2022

(30) Foreign Application Priority Data

Jul. 14, 2020 (GB) ..................................... 2010786

(51) Int. Cl.
*G06F 13/40* (2006.01)
*G06F 13/20* (2006.01)
*G06F 15/80* (2006.01)

(52) U.S. Cl.
CPC .......... *G06F 13/4068* (2013.01); *G06F 13/20* (2013.01); *G06F 15/80* (2013.01)

(58) Field of Classification Search
None
See application file for complete search history.

(56) References Cited

U.S. PATENT DOCUMENTS

| | | | |
|---|---|---|---|
| 10,705,588 B2* | 7/2020 | Ananthakrishnan | G11C 7/22 |
| 2013/0243329 A1* | 9/2013 | Oro | G06V 10/7747 |
| | | | 382/195 |
| 2020/0012537 A1* | 1/2020 | Lacey | G06F 13/4059 |
| 2020/0334188 A1* | 10/2020 | Muto | H04L 25/0292 |
| 2020/0341930 A1* | 10/2020 | Cannata | G06F 9/5077 |
| 2020/0349079 A1* | 11/2020 | Armangau | G06F 13/20 |

OTHER PUBLICATIONS

Samman, Faizal A. et al., Architecture, On-Chip Network and Programming Interface Concept for Multiprocessor System-on-Chip, 2016, IEEE, pp. 155-160. (Year: 2016).*

\* cited by examiner

*Primary Examiner* — Eric Coleman
(74) *Attorney, Agent, or Firm* — Haynes and Boone, LLP

(57) ABSTRACT

A processor comprises a plurality of processing units on an integrated circuit interconnected by an exchange. The exchange has a group of exchange paths extending between first and second portions of the integrated circuit. Each group has a first exchange block in the first portion and a second exchange block in the second portion. The processor has a first external interface in the first portion a second external interface in the second portion and a routing bus which routes packets between the external interfaces and the exchange blocks. The first external interface exchanges packets between the integrated circuit and a host. The second interface exchanges packets between the integrated circuit and another integrated circuit. Errors may be trapped when packets are wrongly addressed. A network of such processors is also provided.

28 Claims, 16 Drawing Sheets

FIG. 3

HOST CONNECTED COMPUTER NETWORK

CROSS-REFERENCE TO RELATED APPLICATIONS

The present application claims priority to United Kingdom Patent Application No. GB2010786.8, filed Jul. 14, 2020, the disclosure of which is hereby incorporated herein by reference in its entirety.

FIELD

The present disclosure relates to a network of interconnected processors connected to a host computer, and to a processor configured to be connected in such a network.

BACKGROUND

There are increasing challenges in creating computer networks for the handling of applications with a high demand for processing capacity and power. Demands are placed on each processor in the network, and on the exchange of data between processors which are connected in a computer network. For example, it is becoming increasingly important to optimize data exchange in machine learning/artificial intelligence applications.

Computer networks can be formed by interconnecting processors (sometimes referred to herein as processing nodes) in certain configurations. One particular goal is to obtain maximum link utilisation, that is to supply traffic to the maximum bandwidth available of links which are used to connect the processors. It is often the case that certain software applications may exchange data between processing nodes in a manner which does not necessarily attain this goal. In that case, links may remain unutilised for periods of time. For certain kinds of links (which remain powered up whether or not they are utilised), this is disadvantageous.

Computer networks may be designed to operate as a work accelerator for receiving a workload from a host running an application. One type of workload may be a machine learning graph comprising a set of vertices and edges. When compiling a graph for implementation on a computer network, it is desirable to minimise the constraints which are placed by the programmer or compiler when compiling such vertices onto the processors.

In one known processor developed by Graphcore, there are multiple tiles arranged on each processor, interconnected on a single chip. Such a processor is referred to herein as an IPU (intelligence processing unit). In such a processor, it is possible to compile vertices for particular tiles within an IPU. It is desirable to minimise the constraints which a toolchain has to place vertices on given tiles and given IPUs when they are connected together in a computer network.

These and other challenges are addressed herein.

SUMMARY

According to an aspect of the present disclosure there is provided a processor comprising:
 a plurality of processing units on an integrated circuit interconnected by an exchange comprising a plurality of exchange paths arranged in groups and extending between a first portion of the integrated circuit and a second portion of the integrated circuit, each group comprising at least one first exchange block in the first portion of the integrated circuit and at least one second exchange block in the second portion of the integrated circuit;
 a plurality of external interfaces comprising at least one external interface in the first portion of the integrated circuit and at least one second external interface in the second portion of the integrated circuit;
 a routing bus configured to route packets between the external interfaces and the exchange blocks;
 wherein the first external interface comprises a host interface for exchanging packets between the integrated circuit and a host connectable to the integrated circuit at the first external interface,
 wherein the second interface is configured to exchange packets between the integrated circuit and another integrated circuit connectable thereto by the second external interface.

The processor may be configured to implement a routing protocol which has one or more of the following characteristics.

Packets sourced by the first exchange block, or exchange blocks, in the first portion of the integrated circuit, are routed by the routing bus only to the host interface and not to the second external interface which may be connected to another integrated circuit. According to a second characteristic, packets incoming from a host via the first external interface are routed only to the first exchange block, or exchange blocks, in the first portion of the integrated circuit and not to exchange blocks in the second portion of the integrated circuit.

The integrated circuit may have a physical configuration such that certain orientations may be identified. These orientations may be defined along a compass point arrangement North, East, South, West. In some embodiments, the integrated circuit is square or rectangular, although this is not necessary. As long as it is possible to identify different separable portions of the integrated circuit, aspects of the present disclosure may be applied. In some embodiments, the first portion is a Western portion, and the second portion is an Eastern portion. It will readily be appreciated that the reverse protocol may equally well be implemented.

In certain interconnected networks, multiple integrated circuits may be connected together in which case their physical orientation should be such that it is possible to identify characteristics of the first and second portion corresponding to the first integrated circuit. To do this, it is simpler if all integrated circuits have a Western portion with certain characteristics and an Eastern portion with certain characteristics. That is, in all integrated circuits in an interconnected network, the first exchange blocks may be in the Western portion and the second exchange blocks may be in the Eastern portion.

The routing bus, the exchange blocks and the interfaces are exchange components which form an exchange network for communicating packets between processing units on and off chip. Communication between processing units on chip may also be via an on-chip interconnect which operates in a time deterministic fashion, although the communication off chip is not time deterministic. Communication between the exchange blocks and the on-chip processing units may make use of the time deterministic on-chip interconnect. The exchange network components in the Eastern portion may be configured to trap a packet which is directed to the host or which has come from the host and designate an error. This may be carried out by the routing bus and/or the interfaces. The interfaces may comprise link controllers may comprise routing registers for this purpose.

The groups of the exchange paths may be arranged in subgroups. Each exchange block may comprise a set of exchange block contexts, each context comprising a logical instance of an exchange block. Each context may manage a subgroup of the group of exchange paths associated with that exchange block. For example, each exchange block may comprise four exchange block contexts for managing four subgroups of the exchange paths.

The integrated circuit may comprise a third external interface arranged in the second portion of the integrated circuit and configured to connect the integrated circuit to a third external integrated circuit.

The integrated circuit may comprise a fourth external interface in the first portion of the integrated circuit arranged to connect a fourth integrated circuit to the fourth external interface of the integrated circuit.

Each processor may have a physical identifier which identifies a physical context of that processor in a network of interconnected processors. For example, the network may comprise a cluster of n chassis, where each chassis comprises m cards, and each card comprises p processors.

Each processor may further comprise a logical identifier wherein the logical identifier identifies a logical context of that processor relative to the other processors to which it is connected. There may be a mapping of physical to logical identifiers based on the connectivity of the interconnected processors in the network, whereby a logical identifier used by one of the processors maps to a unique physical identifier of a connected processor. Aspects of the disclosure also provide a network of such interconnected processors. In some embodiments, in the network, only one of the integrated circuits is connected to a host.

In some embodiments the system may further comprise a host subsystem, and the network of connected processors may be arranged as accelerators to provide an accelerator subsystem to the host. The host may comprise at least one host processor configured with the role of a host for allocating work to the accelerator subsystem, and each of the processors in the accelerator subsystem is arranged to perform work allocated by the host. The host may be privileged and the processors undertake work delegated by the host. In some embodiments each of the accelerator processor chips may take the form of an IPU ("Intelligence Processing Unit") designed specially for use as a machine intelligence accelerator processor.

The host may take the form of a single host CPU, or it may also comprise one or more gateway processors (not shown) arranged as intermediaries between the host CPU and the accelerator processors.

For a better understanding of the present invention and to show how the same may be carried into effect, reference will now be made by way of example to the accompanying drawings.

BRIEF DESCRIPTION OF FIGURES

Figure 3:
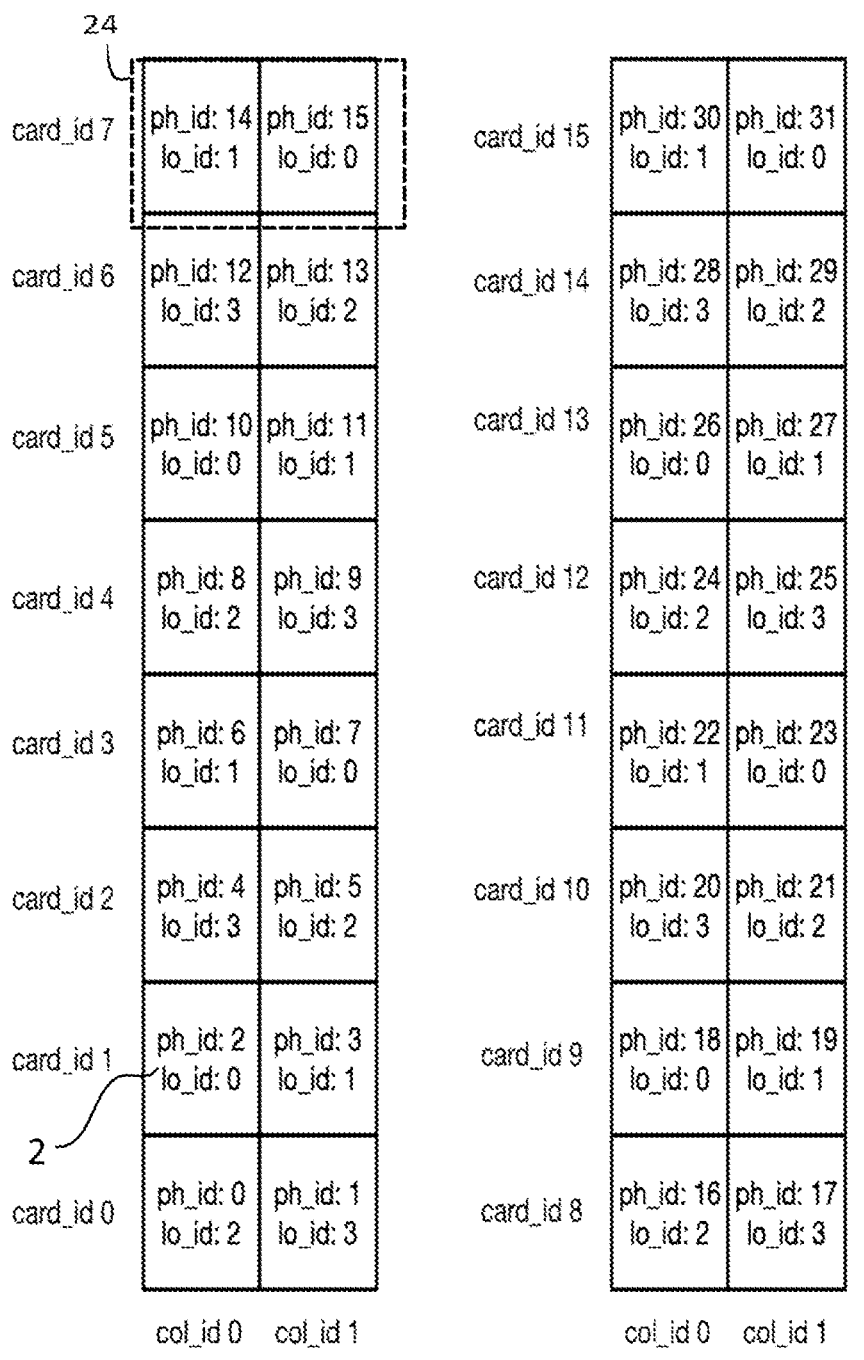

FIG. 3 is a schematic diagram showing the routing of packets on a single IPU within a default or sliding window configuration.

DETAILED DESCRIPTION OF FIGURES

Figure 1:
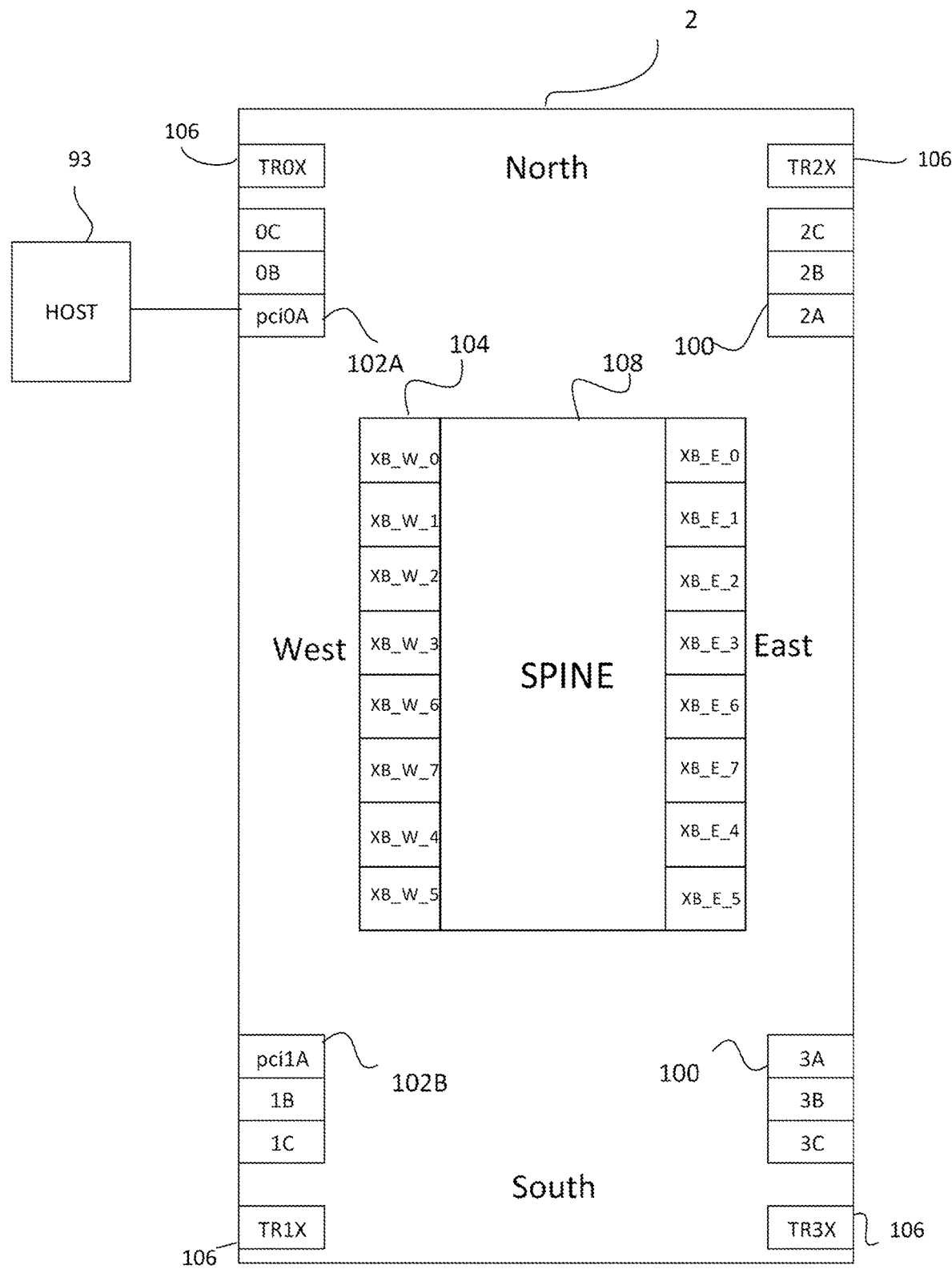
FIG. 1 is a schematic diagram of an IPU showing link interfaces and exchange blocks.

The following description relates to a processor that can be readily and effectively interconnected in a number of different network configurations. The processor may be of the type described in Graphcore patent applications Publication Nos. GB2569430 [PWF ref: 408525 GB], GB2569276 [PWF ref: 408526 GB], and GB2569275 [PWF ref: 408527 GB], the contents of which are herein incorporated by reference. Such a processor may be referred to herein as IPU (Intelligence Processing Unit). FIG. 1 is a schematic diagram of a single IPU 2 connected to a host 93, which may be connected together with other IPUs in different network configurations. The IPU comprises multiple processing units, sometimes referred to as tiles.

Each IPU may be formed on a single integrated circuit (sometimes referred to herein as a chip or die) with different portions of the integrated circuit having different components of connection circuitry provided thereon. For example, the integrated circuit may have designated first and second portions. In some physical layouts, it may be possible to designate the first portion as a west portion, and the second portion as an east portion. In this case, these would correspond to compass axes in a particular integrated circuit layout, although it will readily be understood that there is no need for a particular physical orientation when the integrated circuit is used. What is important, however, is that the designations of the connection components in these portions may have certain particular functions. The integrated circuit may also have north and south portions designated to accommodate certain processing units of the integrated circuit and connection components. Thus, the terms north, south, east and west are used to denote portions of the integrated circuit that forms the IPU and may be used to designate certain connection functionality with other IPUs which have similar designated portions.

The IPU in FIG. 1 is oriented with north at the top and south at the bottom, but irrespective of its physical orientation, link interfaces of the IPU have certain connection designations. Link interfaces referenced 0C or 0B are said to be north interfaces. That is, an IPU connected to 0C or 0B of another IPU is said to be connected to its north. Similarly, an IPU connected to link interfaces corresponding to 1C or 1B are said to be connected to the south. The west and east portions of the IPU are defined relative to these definitions of north and south. The east portion comprises Link Controllers (LCs) 100, labelled 2A-C and 3A-C, which are described later, and the west portion contains the link interfaces 100, labelled 0B, 0C, 1B, 1C (for North and South connections) and primary and secondary PCI complexes 102A and 102B, which are used for host communication as described below. The IPU 2 also contains a spine 108 comprising an interconnect 34 described further herein with reference to FIGS. 6 and 11 and a bank of eight exchange blocks 104 along the west edge of the spine 108, labelled [XB_W_0:XB_W_7], and a bank of eight exchange blocks 104 along the east edge of the spine 108, labelled [XB_E_0: XB_E_7]. Each exchange block manages groups of exchange paths of the interconnect which interconnects the tiles, and mediates exchange traffic. The exchange traffic may comprise read and write requests to a PCI (host) domain and unicast and broadcast write requests to tiles on other IPUs via an exchange network comprising trunk routers and link interfaces. The trunk routers comprise switches 106 (labelled TR0X-TR3X). Each exchange block interfaces to the link interfaces via a dedicated trunk router lane controlled by the trunk router switches [described later] (these are not shown in FIG. 1 for reasons of clarity).

According to aspects of the present disclosure, the IPU communicates with a host connected to it only via the west side exchange blocks. Host communication uses two link interfaces on the West edge of the IPU 2 which are connected via the PCI complexes—the primary PCI complex 102A is in the NW quadrant and the secondary PCI complex 102B is in the SW quadrant.

Each PCI complex may comprise:
A Control Port that allows the PCI connected host to initiate requests and receive response on a control bus.
A block of PCI Complex Blacklist registers accessed direct from the PCI Controller.
A block of PCI Complex Whitelist registers accessed direct from the PCI Controller regardless of operating mode.
A Host Exchange (HEX) subsystem which interfaces the PCI controller to the link interfaces, providing buffering and read response sequence tag association logic.
A Host Sync Proxy (HSP) that provides for a host interface into the Global card to card Sync mechanism. Further details of the host sync proxy are given in Patent Application Publication No. 2580134 [PWF Ref: 412568 GB], the contents of which are herein incorporated by reference.

The exchange network described further herein comprises:
trunk routers (TR) that transport exchange packets and flow control information along the West edge and East edge, and link controllers which are provided at the link interfaces. The trunk router comprises eight lanes. Each lane has a certain direction relative to the IPU. There are four "Northbound" lanes and four "Southbound" lanes. A Northbound lane carries traffic from the south portion of the chip to the north portion of the chip. A Southbound lane carries traffic from the north portion of the chip to the south portion of the chip. That is, each lane is uni-directional. Each link controller comprises a PCI subsystem and logic to connect the PCI subsystem to the appropriate trunk router lane or lanes.

A trunk router is a simple three port switch which carries four 128-bit ELink lanes north and another four lanes south. The link controller is a PCI controller specialised to carry ELink packets over a PCI link with minimal modification to the Elink packet contents to render them as PCI compliant as possible and without loss of information required to route the packets.

Each exchange block, PCI complex and link controller in the exchange network has a dedicated trunk router which delivers traffic to and accepts traffic from that block. An additional trunk router is instanced in each of the four corners of the IPU, such that the trunk ports, which would otherwise be left dangling at the top and bottom of the west and east edge trunks are looped back such that for example, the north-going 128-bit lane 'A' trunk egress port of the last trunk router is looped back to the 128-bit south-going lane 'A' trunk ingress port of the same trunk router, and likewise for lanes B, C and D. The exchange ports of these corner trunk routers, which would normally connect to an attached block (either exchange block or link controller) are instead connected to the corresponding exchange ports of the corner trunk routers of the chip edge directly opposite.

The chip-to-chip exchange network may only route ELink packets, and only ELink Tile Write (ETWR) ELink packets may be transportable across links between IPUs. Packets which traverse links between IPUs use PCI Vendor Defined Message (VDM) packets. PCI packets are automatically translated to Elink packets and vice versa when they cross between the [Newman] domain and a PCI domain. ETWR packets are transported off-chip via the link controllers and on-chip by Elinks and trunk routers. The chip-to-chip exchange network routes packets which target tile space (ETWR packets) using bits 5:3 of the packet's TILE ID, and packets which target tile PCI space (EPWR and EPRD) using the MSB (most significant bit) of the ELink PCI address. Packets targeting tile space are routable between up to 16 IPUs. Multicast and broadcast are supported using a broadcast bitmap field of an ETWR packet, enabling a given tile to multicast or broadcast a packet to a single specified tile on one, some, or all IPUs in an exchange network.

ETWR packets have attributes which enable routing, which may comprise the following:
A 16-bit broadcast bitmap which identifies the destination IPU of the packet so as to support multicast.
An 11-bit TILE ID identifying the final destination tile of the packet. This is described in more detail with reference to FIG. 6.
A 4-bit source ID identifying the sending IPU and an 11-bit source tile ID identifying the sending tile. This is required for debugging purposes.

Bits 5:3 of the TILE ID are used to route a packet to a specific exchange block and the broadcast bitmap is used to through-route packets until they reach the final destination node.

The trunk router may comprise:
Four ELink ingress interfaces on its south edge, which connect via buffering to four ELink egress interfaces on its north edge.
Four ELink Ingress interfaces on its north edge which connect via buffering to four ELink egress interfaces on its south edge.
Two exchange ingress/egress interfaces which are also ELinks, to the connected exchange block or link controller, one for each of north and south.

Traffic may be injected into the trunk via the exchange ingress interfaces and routed onto any of the four lanes in the given direction based on the trunk router's routing tables. Traffic may only leave the trunk via the exchange egress interface from one of the four lanes, based on a static configuration of the routing tables.

An egress interface on the south edge of a given trunk router may connect to the corresponding ingress interface on the north edge of the next trunk router via abutment or a vertical upper layer wiring channel to a distant trunk router; likewise for north edge egress interfaces and south edge ingress interfaces. Traffic may not cross lanes in the trunk router, but stays within a given lane until consumed by an exchange block or link controller.

Trunk routers comprise a number of control registers, including registers for routing. These may comprise an exchange egress routing north register (XEGRNR), for northbound traffic leaving the trunk router, an exchange egress routing south register (XEGRSR), for southbound traffic leaving the trunk router, and an exchange ingress lane routing register (XIGLRR) for ingress traffic entering the trunk router from the attached block (exchange block or link controller).

The egress routing registers for both north and south include fields 'TILEMEN' to enable tile ID matching, 'IPUMEN' to enable IPU ID matching, and fields 'TILEBM' and 'IPUBM' which hold a tile ID match bitmap and IPU ID match bitmap for egress respectively.

The ingress routing register include fields 'NTILEMEN' and 'STILEMEN' which enables tile ID matching for traffic entering via ingress exchange port on the north and south edges, respectively. The ingress routing register also includes a field 'NOMATCHEN' which specifies the use of the 'LANENTM' lane if there is no tile match. The ingress routing register also contains a field 'TID{N}LANE' for each tile ID, comprising 2 bits which define which of the four lanes a packet with that tile ID should be assigned.

All packets entering a trunk port must have had the north/south routing determination made in the connected exchange block or link controller, in order that the packet enters the trunk router on the correct ingress interface.

For ingress routing, to determine the lane an EPRD or EPWR packet is placed onto, a 'LANEPCI' field of XIGLRR specifies the lane to use, regardless of whether the packet arrived on the north or south ingress port.

For ETWR packets, a routing determination is made at the point of ingress to the trunk router for each of the four lanes simultaneously as follows:

For a packet arriving at the trunk router's north exchange ingress port, if the 'NTILEMEN' field of XIGLRR is set then the lane the packet routes to is specified in the 'TID{N}LANE' where N is equal to bits 5:3 of the packet's tile ID.

For a packet arriving at the trunk router's south exchange ingress port, if 'STILEMEN' field is set then the lane the packet routes to is specified in 'TID{N}LANE' field where N is equal to bits 5:3 of the packet's tile id. The value in the TID{N}LANE field specifies lane A if 00b, lane B if 01b, lane C if 10b and lane D if 11b.

If the above condition is not met then if 'NOMATCHEN' is set, the packet routes to the lane specified in the 'LANENTM' field.

If neither of the above conditions is met, then this is an error case. Error handling is described in more detail below.

For egress routing, separate registers may be used for north and south going traffic as follows:

Traffic traveling north (that is, from any ingress port on the south edge of the TR towards any egress port on the north edge) uses the contents of XEGRNR. Because traffic traveling north passes the xes (south exchange egress) port first, north going traffic that matches for egress exits via xes.

Traffic traveling south (that is, from any north ingress trunk port of the TR towards any south egress trunk port) uses the contents of the XEGRSR. Because traffic traveling south passes the xen (north exchange egress) port first, south going traffic that matches for egress exits via xen.

EPRD or EPWR packets entering the trunk router from north trunk ports always egress from the Trunk via xen if 'PCIEG' is 1b AND the packet is on the lane which matches 'EGLANE' of XEGRNR. If both these conditions do not hold then the packet shall be routed to the opposite trunk port. This applies to packets entering from south trunk ports with the corresponding fields of XEGRSR.

ETWR packets may exit a trunk router via the appropriate trunk router egress interfaces or may route to the opposing side of the trunk router if there is no egress routing match, or both in the case of a multicast packet. A routing determination must be made to select one of these options at the point of ingress to the trunk router. Please note that references to fields below refer to fields of XEGRNR or XEGRSR as appropriate, depending on the entry of the given packet via north or south trunk ports. If the 'EGLANE' field of XEGRNR/XEGRSR is set to the same lane the packet is on, then then it may exit the trunk to an exchange egress port via the following mechanism:

If 'TILEMEN' is set, the one-hot expansion of the packet's tile id[5:3] AND-ed with 'TILEBM' then OR-reduced must evaluate to 1b for the packet generate an Egress Tile Match.

If 'IPUMEN' is set, the packet's BC Bitmap field AND-ed with 'IPUBM' then OR-reduced must evaluate to 1b for the packet to generate an Egress IPU Match.

If 'TILEMEN' and 'IPUMEN' are set then both a tile match and an IPU match must be valid in order for the packet to qualify for egress routing here.

If neither of these conditions is true and/or the packet is on the wrong lane (as per the EGLANE field setting) then the packet shall route to the opposing trunk port. If this was due to misconfiguration of the exchange network or bad tile software, then the packet will end up stuck in the trunk and will trigger an error when the hopcount field reaches 31. Packets that egress to endpoints must have their BC Bitmap field adjusted to clear the bits which correspond to those which are set in the 'IPUBM' field as follows:

bcbitmap_egress[15:0]=packet.bcbitmap & IPUBM

Following the operation above, the operation below will confirm whether the packet should also route to the opposite trunk egress port. If any bits of bcbitmap_onward are set the packet must also route to the opposing trunk egress port, with a bcbitmap field equal to that derived in bcbitmap_onward:

bcbitmap_onward[15:0]=packet.bcbitmap & ~bcbitmap_egress.

In the event that an exchange ingress packet matches no trunk router lane, an error is raised with the error status 'IGNOMATCH', the ERROR bit of the trunk router's control and status register is set, the ERRCODE is set to 'UR' and ERRSTATUS bits of the control and status register are set to 'IGNOMATCH', and the packet header is saved in error record registers of the trunk router.

Link controllers and exchange blocks also comprise control registers, including an exchange egress routing direction register (XERDR) which defines how packets leaving the link controller for the trunk with a given broadcast bitmap are routed north, south, or both. This register comprises a 16-bit 'NORTH' field, where each bit corresponds to one IPU ID and if the bit for that ID is set then packets for that ID should be routed north. The exchange egress routing direction register also includes a 16-bit field 'SOUTH', where each bit set corresponds to one IPU ID and if the bit for that ID is set then packets for that ID should be routed south.

The exchange network routes packets through the IPU to other interconnected IPUs to form multi-chip networks with all-to-all capability, also providing for any tile to be able to communicate with any tile on another IPU device and for any tile to communicate with the host's PCI domain. All tiles can be accessed by posted writes from the host to boot the IPU.

As explained above, the exchange network transports ELink packets and TLink packets. The ELink packets are of three packet types: ELink Tile Write (ETWR), ELink PCI Write and ELink PCI Read (EPWR and EPRD). Only ETWR packets are transportable across link interfaces between different IPUs. PCI packets are automatically translated to ELink packets and vice versa when they cross between the chip domain and a PCI domain. Packets may be generated with addresses to route them to off chip tiles, for example using bits of tile identifier. Note that there is no need in some embodiments to provide addresses for inter tile traffic within a single IPU—a time deterministic exchange may be used as the interconnect within an IPU.

As discussed above, multicast and broadcast is supported using a sixteen bit broadcast bitmap field of an ETWR packet, which identifies the destination IPU of the packet and thus enables a given tile to multicast or broadcast a packet to a single specified tile on one, some or all IPUs in a routing domain (i.e. the set of IPUs a given IPU can communicate with). The exchange network is described in more detail with reference to FIG. 11.

The sixteen-bit broadcast bitmap allows identification of any of sixteen IPUs as a destination for a given packet. In an example configuration in which all IPUs within a cluster of thirty-two IPUs held on sixteen cards divided into two chassis, a multicast packet originating from any IPU in a given chassis with broadcast bitmap '0110000000001111b' will visit IPUs 14,13,3,2,1 and 0 of that chassis corresponding to the bits of the bitmap containing 1s. The broadcast bitmap may be subject to constraints imposed by the configuration, as described below.

Figure 2:
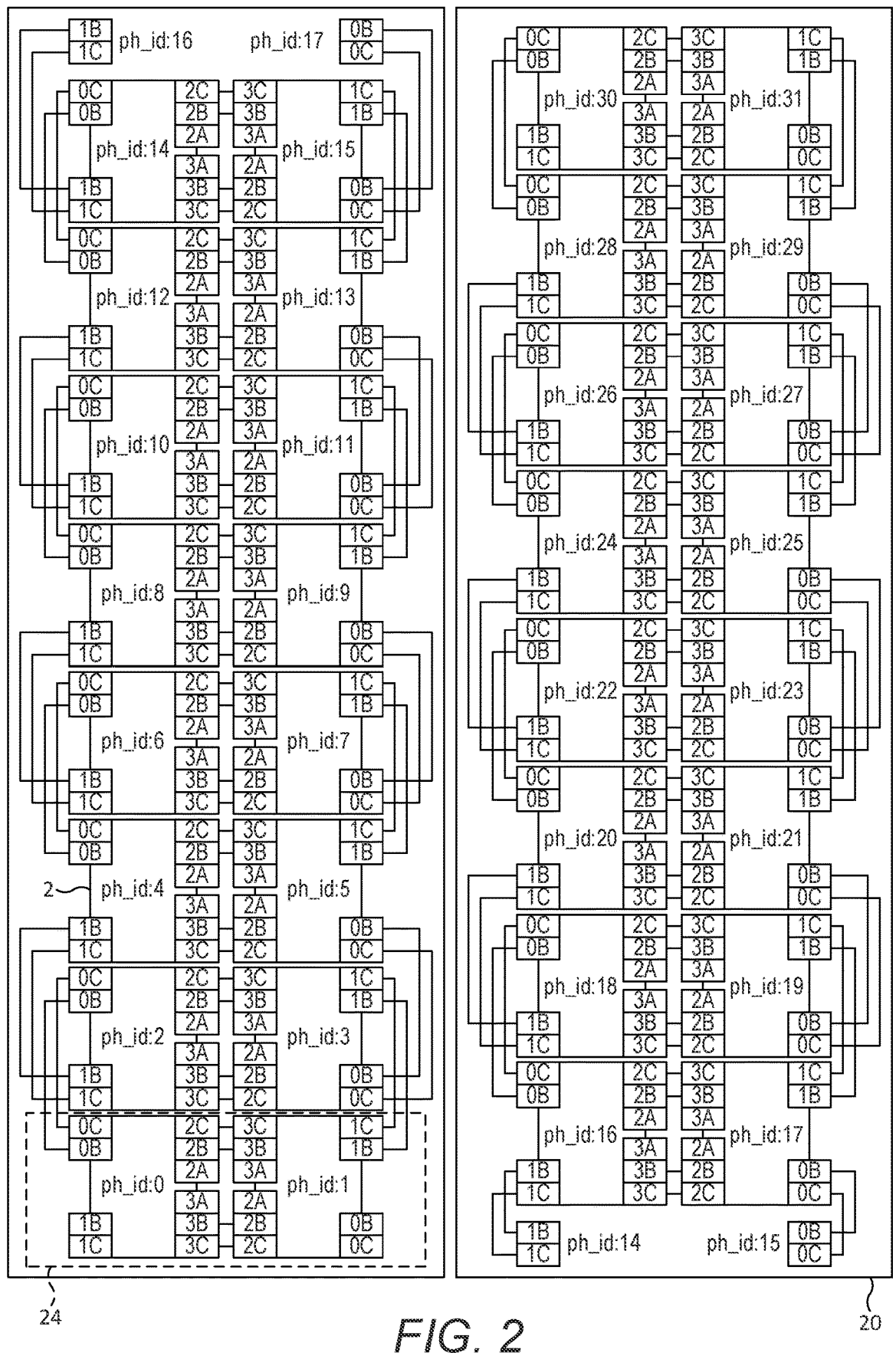
FIG. 2 is a schematic diagram showing the wiring of a cluster of IPUs contained in 2 chassis.

FIG. 2 shows an example arrangement of IPUs 2 in a cluster comprising two chassis 20 stacked on top of each other. A cluster may comprise any suitable number n of chassis, for example up to eight, but embodiments described from this point on will be assumed to comprise two chassis stacked on top of each other. Each chassis comprises a suitable number m of cards 24. For example, m=four or eight. FIG. 2 shows the cards 24 of chassis 0 and 1 on the left and right respectively for clarity. Within each chassis is a set of eight PCI cards 24, assigned card_id 0 to 7 from the bottom up. Each card comprises a number p of IPUs. In this embodiment, each card comprises two IPUs, with the left IPU on each card assigned col_id 0 and the right IPU assigned col_id 1. Each IPU is associated with a routing domain, which is the set of IPUs that the IPU can communicate with (including itself). A default configuration assigns physical IDs to IPUs such that the non-rotated IPU (ph_id 0 in FIG. 2) on the south-most card in the chassis gets ph_id=0d, and the second IPU on that same card gets ph_id=1d. The IPUs on the second card get ph_ids 2d and 3d, and so on until the 8th card which gets ph_ids 14d and 15d. Therefore, all the IPUs on the west side of the PCI card have even ph_ids and the IPUs on the east side of the PCI card have odd ph_ids. Each IPU's physical ID, ph_id, according to its position within the cluster, is given by the formula: ph_id=8*chassis_id+2*card_id+col_id.

Within the cluster, the link controllers at link interfaces 2B, 2C, 3B and 3C of the east edges of each of the two IPUs on the same card are connected. The west edge of each IPU 2 contains four link controllers that can be connected to the west edge of other IPUs. These west edge connections are made according to the following rules:

If ph_id % 4 (modulo 4) is 1 or 2 for an IPU, then its north interfaces 0C and 0B are connected to those of the IPU directly below and its south interfaces 1B,1C are connected to those of the IPU directly above it. This can be seen in FIG. 2, for IPUs with ph_ids 2, 6, 10, 14. The IPUs of the bottom card of the cluster only connect to IPUs of the card above.

The interconnects between multiple IPUs may be configured according to a 'Barley Twist' or ladder configuration described more fully below. Such a configuration may be used to perform a collective ring all-reduce function over a cluster of chips in the case where the whole model fits on each IPU and where the user occupies the full cluster. The Barley Twist configuration uses eight link interfaces per chip and it is nearest neighbour only, meaning that tiles within each IPU can only communicate with tiles of three other IPUs: the one directly above, below and to the side of it, and itself.

A cluster of two chassis is wired for the Barley Twist configuration according to FIG. 2, with the exception that the link interfaces 2A and 3A on the east edge are not wired. On the west edges, the link interfaces 1B and 1C of ph_id 30 are connected to the corresponding link interfaces of ph_id 0 and the link interfaces 0B and 0C of ph_id 31 are connected to the corresponding link interfaces of ph_id 1. The topology of the linked cluster takes the form of a looped ladder.

Figure 2A:
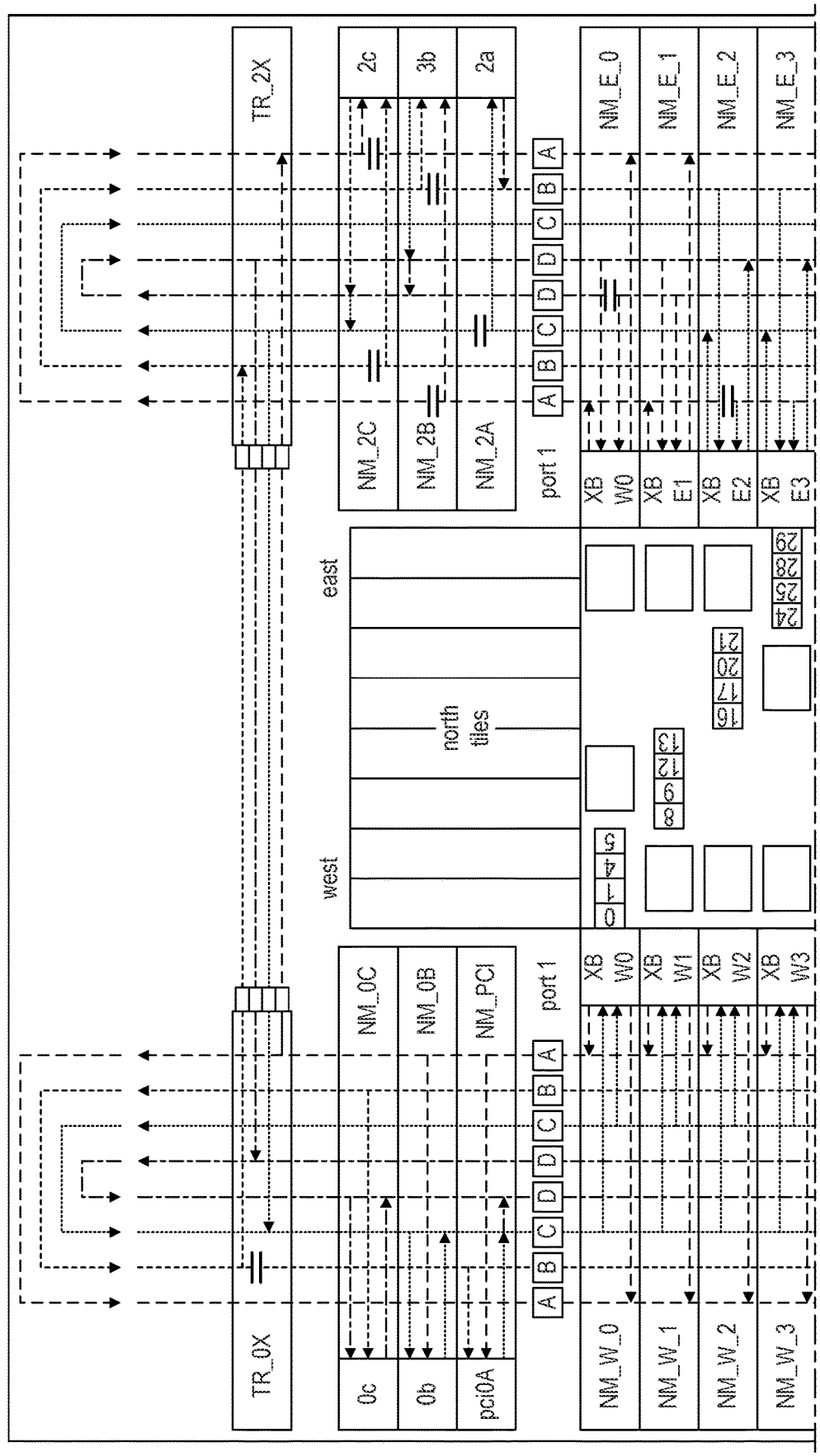
FIG. 2A is a schematic diagram of the physical and logical ID mapping for a cluster of IPUs in 2 chassis following a barley twist configuration.
Figure 2A:
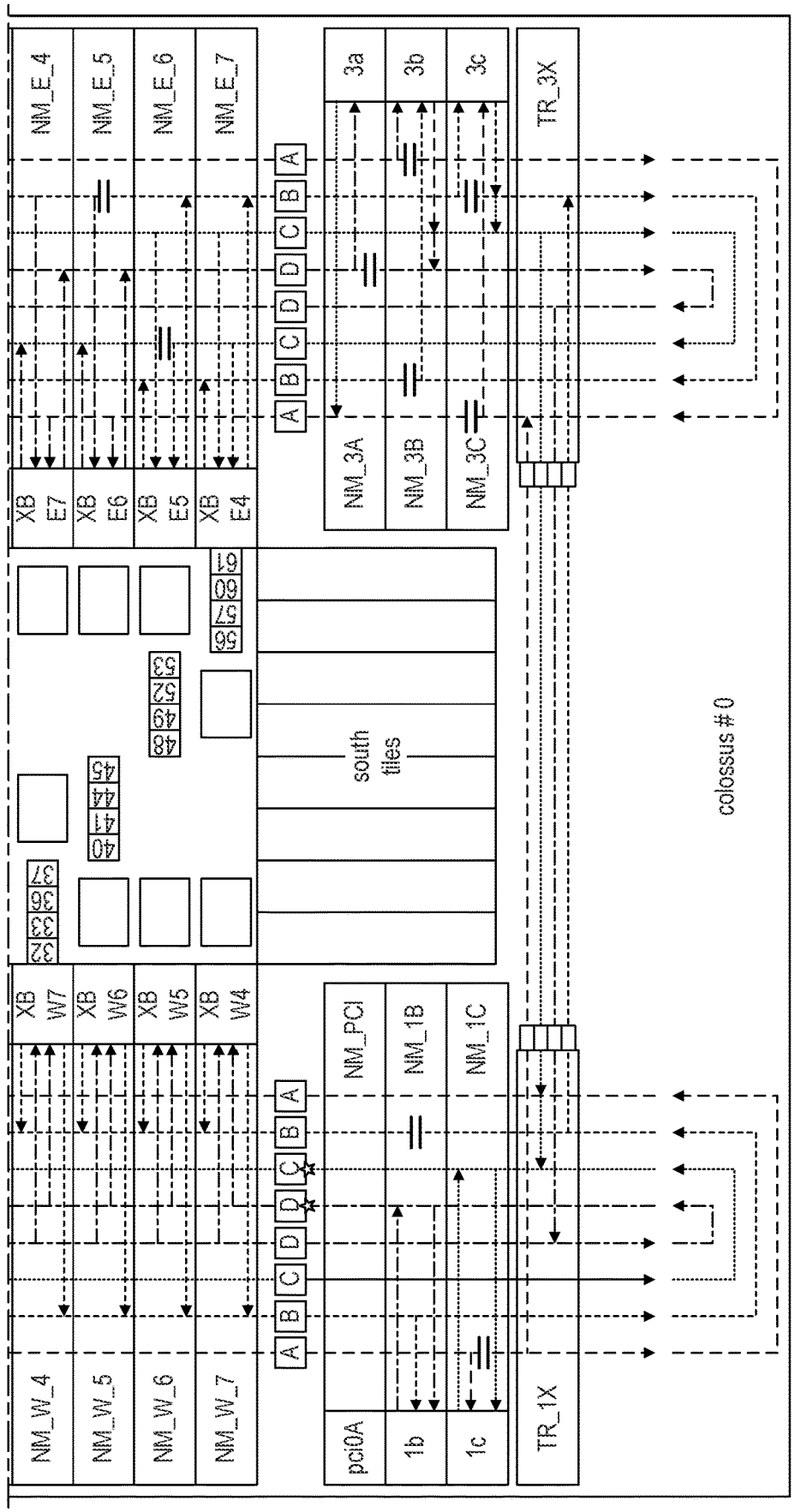

In addition to physical addresses, each IPU is associated with a logical id according to the routing domain for IPUs within the Barley Twist configuration. Since each IPU can only communicate with its direct neighbours, the physical to logical address map follows the rule that no adjacent IPUs can have the same logical id (lo_id). The lo_ids thus run from 0 to 3 in a repeating 'T' pattern within the physical cluster. This is shown in FIG. 2A.

Routing of packets according to this configuration may be subject to a number of 'hard' and 'soft' constraints, where 'hard' constraints are enforced by the configuration, such that attempts to dispatch packets that violate hard constraints are trapped as an error, while violation of soft constraints do not introduce functional errors or packet loss but may introduce temporary blocking.

The hard constraints for the Barley Twist configuration include the following:

Packets sourced by an IPU must be addressed to a neighbouring IPU, i.e. packets are only addressed to lo_ids 0-3, which are within the routing domain. This means that all packets must have broadcast bitmaps with bcbm[15:4]==0b, i.e. the bits corresponding to logical ids above 3 are 0 and packets cannot be addressed to these lo_ids.

Packets sourced by west edge exchange blocks may only be addressed to the host and packets arriving from either of the PCI complexes may only be routed to west edge exchanges.

Packets sourced by east edge exchange blocks must not be routed to west edge exchange blocks, whether on the same or different IPUs.

Packets sourced by exchange blocks XB 0-3 may only be addressed to the IPUs attached to the east or south of the source IPU.

Packets sourced by exchange blocks XB 4-7 may only be addressed to the IPUs attached to the east or north of the source IPUs.

The soft constraints may include the following, and full link utilisation may be achieved by meeting the following criteria:

- Tiles serviced by exchange blocks XB0, XB1 of a given IPU should only send exchange packets to tiles serviced by the corresponding exchange blocks of a neighbouring IPU.
- Tiles serviced by exchange blocks XB2, XB3 of a given IPU should only send exchange packets to tiles serviced by the corresponding exchange blocks of a neighbouring IPU.
- Tiles serviced by exchange blocks XB4, XB5 of a given IPU should only send exchange packets to tiles serviced by the same exchange blocks of a neighbouring IPU.
- Tiles serviced by exchange blocks XB6, XB7 of a given IPU should only send exchange packets to tiles serviced by the same exchange blocks of a neighbouring IPU.
- Traffic should be balanced such that a given tile or set of tiles does not repeatedly target the same tile on another IPU so as to avoid overspill of blocked traffic into the target tile's local trunk router where it could block other traffic.
- Traffic should be balanced such that sufficient numbers of exchange blocks are sourcing traffic so as to saturate the link bandwidth available
- Each exchange block should generate balanced northbound and southbound trunk traffic.

Figure 4:
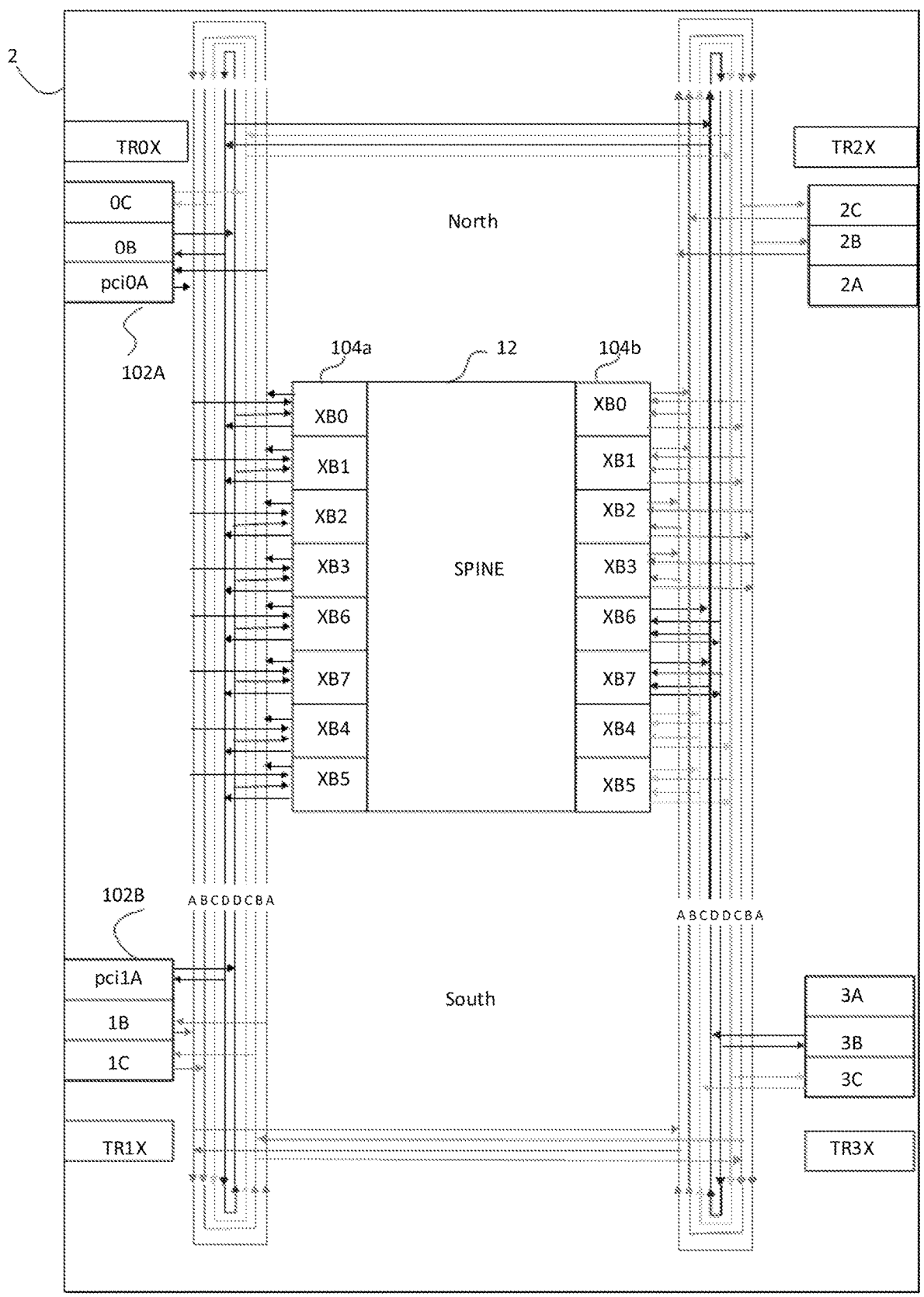
FIG. 4 is a schematic diagram showing routing of packets on a single IPU within a barley twist configuration.

FIG. 4 shows a schematic diagram of the Barley twist configuration for one IPU (IPU 0) on a single PCI card.

As described above, the trunk comprises a set of lanes extending north-south on the east and west side of the chip. FIG. 4 illustrates four north going lanes and four south going lanes on the west side, and four north going lanes and four south going lanes on the east side. These are distinguished by colour and letter. The direction of the lane is denoted by the arrowhead on the lane itself. For example, the left hand most lane shown in FIG. 4 is red lane A, southbound. The colours are provided to indicate routing protocols operated via the trunk router switches 106, the exchange blocks 104 and the link controllers.

As can be seen in FIG. 4, the west edge exchange blocks 104a receive packets (black) from the primary PCI complex 102A on the south-going lane A and packets from the secondary PCI complex on the north-going lane D. The primary PCI complex receives packets from exchange blocks on north-going lane A and the secondary PCI complex receives packets from exchange blocks on south-going lane D. Lanes A and D are also used for tile-to-tile traffic, but only traffic addressed to the IPUs connected to the south and north edges, respectively. Link interface 0C receives packets from local tiles (sourced from exchange blocks XB4 and XB5 of the east edge) on the south going lane C, and receives packets addressed to local tiles serviced by the corresponding exchange blocks from neighbouring IPUs and forwards them on the north-going lane C. These are marked in yellow in FIG. 4. Link interface 0B receives packets from local tiles (sourced from exchange blocks XB6 and XB7 of the east edge) on the south-going lane D and forwards packets received from neighbouring IPUs to exchange blocks XB6 and XB7 on the north-going lane D. This is marked in blue in FIG. 4. Link interface 1C receives packets from local tiles (sourced from exchange blocks XB0 and XB1 of the east edge) on the north-going lane B and forwards packets received from neighbouring IPUs to exchange blocks XB0 and XB1 on the south-going lane B. This is marked in green in FIG. 4. Link interface 1B receives packets from local tiles (sourced from exchange blocks XB2 and XB3 of the east Edge) on the north-going lane A and forwards packets received from neighbouring IPUs to exchange blocks XB2 and XB3 on the south-going lane A. This is shown in red in FIG. 4.

Odd numbered IPUs (by physical id) use the following routing for the link interfaces 0B, 0C, 1B and 1C: Link interface 0C receives packets from local tiles (sourced from exchange blocks XB4 and XB5 of the east edge) on the north going lane C, and receives packets addressed to local tiles serviced by the corresponding exchange blocks from neighbouring IPUs and forwards them on the south-going lane C. Link interface 0B receives packets from local tiles (sourced from exchange blocks XB6 and XB7 of the east edge) on the north-going lane D and forwards packets received from neighbouring IPUs to exchange blocks XB6 and XB7 on the south-going lane D. Link interface 1C receives packets from local tiles (sourced from exchange blocks XB0 and XB1 of the east edge) on the south-going lane B and forwards packets received from neighbouring IPUs to exchange blocks XB0 and XB1 on the north-going lane B. Link interface 1B receives packets from local tiles (sourced from exchange blocks XB2 and XB3 of the east edge) on the south-going lane A and forwards packets received from neighbouring IPUs to exchange blocks XB2 and XB3 on the north-going lane A.

For east edge to east edge exchange, the exchange blocks both send and receive from the north-going and south-going lanes as required according to the following mapping, if soft constraints are being respected:

| Lane A | XB2, XB3 |
| Lane B | XB0, XB1 |
| Lane C | XB4, XB5 |
| Lane D | XB6, XB7 |

If soft constraints are not respected, any of exchange blocks XB0-3 may use either of lanes A or B and any of exchange blocks XB4-7 may use either of lanes C or D.

Receipt and forwarding of packets by LCs on the East edge is now described for IPU 0 (and all even numbered IPUs) with reference to FIG. 4. LC2C receives packets from local tiles (sourced from exchange blocks XB0 and XB1) on the north-going lane B and forwards packets received from neighbouring IPUs to exchange blocks XB0 and XB1 on the south-going lane B. This is marked in FIG. 4 by green arrows in LC2C. LC2B receives packets from local tiles (sourced from exchange blocks XB2 and XB3) on the north-going lane A and forwards packets received from neighbouring IPUs to exchange blocks XB2 and XB3 on south-going lane A. LC3C receives packets from local tiles (sourced from exchange blocks XB4 and XB5) on the south-going lane C and forwards packets received from neighbouring tiles to exchange blocks XB4 and XB5 on the north-going lane C. LC8B receives packets from local tiles (sourced from exchange blocks XB6 and XB7) on the south-going lane D and forwards packets from neighbouring tiles to exchange blocks XB6 and XB7 on north-going lane D.

For odd-numbered IPUs, the exchange on the East edge is as follows: LC2C on odd-numbered IPUs receives and forwards packets on the north-going and south-going lane C, respectively, where the packets are sourced from and routed to exchange blocks XB4 and XB5. LC2B receives from and forwards to exchange blocks XB6 and XB7 on the north-going and south-going lane D, respectively. LC3C receives from and forwards to exchange blocks XB0 and XB1 on the north-going and south-going lane B, respectively. LC8B receives from and forwards to exchange blocks XB2 and XB3 on the north-going and south-going lane A, respectively.

An example of packet routing for three unicast packets will now be described with reference to FIG. 5, which shows a scenario with eight cards (in FIG. 5, designations NMOB, NMOC etc. relate to 0B, 0C etc. in FIG. 4). The IPU with ph_id 4 (lo_id 3) sends three packets as follows:

1. Packet 1, to be received by ph_id 2 (lo_id 0) on exchange block XB2 of the East edge.
2. Packet 2, to be received by ph_id 5 (lo_id 2) on exchange block XB0 of the East edge.
3. Packet 3, to be received by ph_id 6 (lo_id 1) on exchange block XB5 of the East edge. (note that for clarity an IPU labelled ph_id x is referred to simply as ph_id x)

Figure 5:
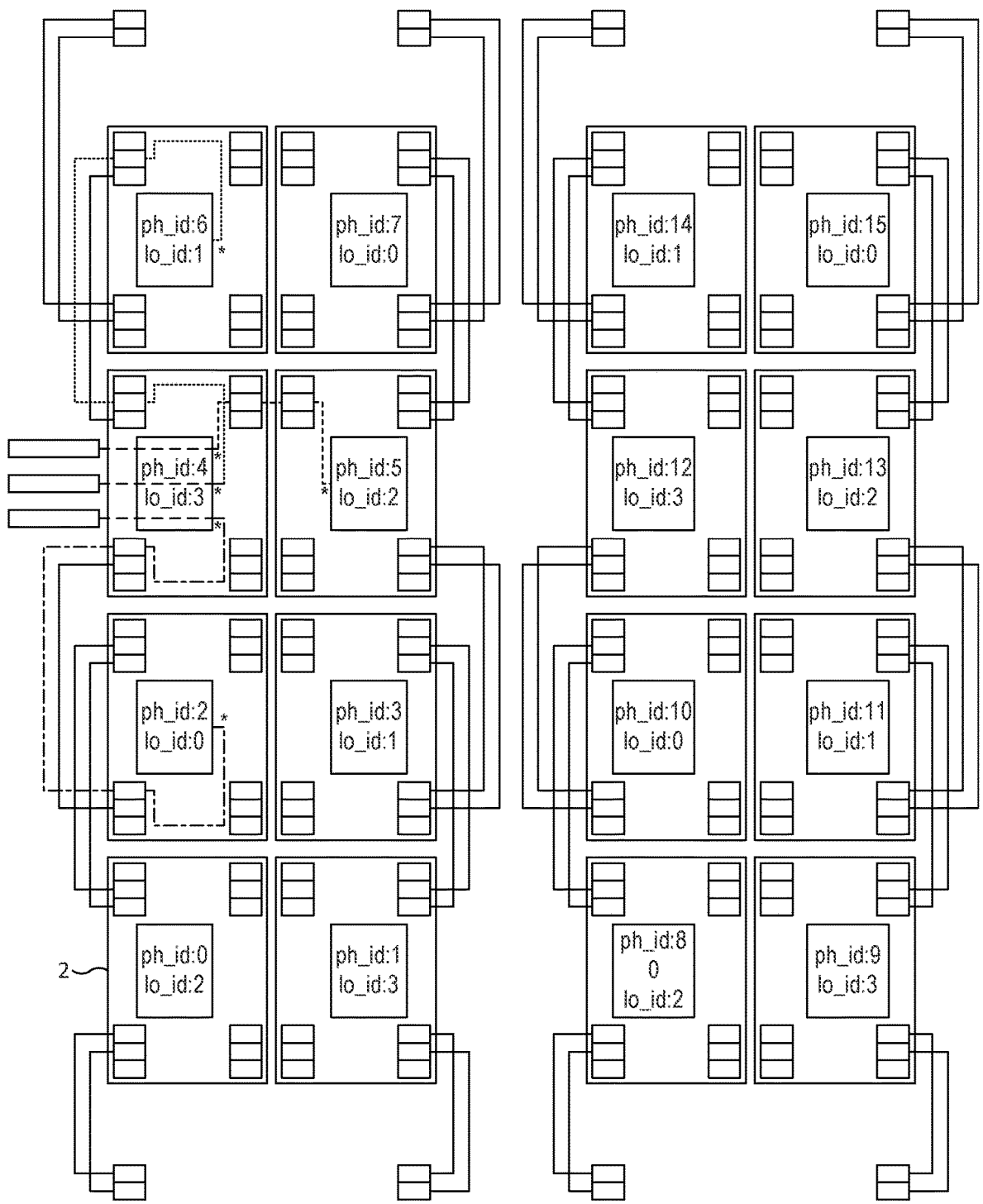
FIG. 5 is a schematic diagram showing the routing of three unicast packets between IPUs in a cluster according to the barley twist configuration.

The packet visiting ph_id 2 takes the path marked in FIG. 5 in red. The packet first routes south on ph_id 4, sourced from exchange block 2 or 3 and moving along lane A if following soft constraints, reaching the trunk router switch TR3X, where it crosses to the West edge and exits through link interface 1B, moving to the neighbouring IPU ph_id 2 via the corresponding link interfaces on ph_id 2 1B. It travels south to reach the trunk router switch TR1X, crossing over to the East edge, and then travels along the north-going lane A to reach exchange block XB2, where it is translated onto the interconnect 34 between local tiles. This may involve placing the packet onto the interconnect on one of the exchange paths accessible to that exchange block, or firstly removing any header or destination identifier.

The packet addressed to ph_id 5 takes the path coloured green in FIG. 5. The packet first moves north within ph_id 4 to reach link interface 2C, crossing to the East edge of ph_id 5. The packet then travels north until it reaches East edge exchange block 0 where it terminates. If following soft constraints, the packet will be sourced from one of exchange blocks XB0 or XB1 of ph_id 4 and will follow lane B.

Packet 3, visiting ph_id 6 (lo_id 1) takes the path coloured orange in FIG. 5. The packet first routes north on ph_id 4 to reach trunk router switch TR2X, where it crosses to the West edge and exits through link interface 0C and enters ph_id 6 though the corresponding link interface 0C. It then travels north on ph_id 6 to trunk router switch TR0X and crosses into the East edge before traveling south until it reaches exchange block XB5 where it terminates. If soft constraints are followed, this packet will be sourced from one of exchange blocks XB4 or XB5 and will follow lane C.

The access of tiles of the IPU by exchange blocks which enables exchange of packets according to the above configuration will now be described with reference to FIG. 6. Each bank of eight exchange blocks 104, on the west edge and east edge respectively, can connect to any tile in the IPU. Each exchange block 104 is joined to the exchange network via a trunk router labelled TR. The exchange block 104 communicates directly with the tiles via 4 external spine buses (driven by the exchange block 104) and tile spine buses each driven by one tile processor. The spine busses are also referred to herein as exchange paths. The exchange block 104 sends TLink packets into the external spine bus. Each packet may be seen by all tile processors connected to that spine bus and each tile processor decides whether to act on each packet. The tile processors send TLink packets on their own output buses which are connected to the on-chip interconnect, not shown in FIG. 6. These TLlink packets are readable by the exchange block 104 from the on-chip interconnect, according to a time deterministic protocol discussed later with reference to FIG. 11.

Each exchange block 104 has the following interfaces:
xen and xes, two ELink interfaces for traffic leaving the exchange block 104 for the trunk northwards and southwards respectively
xin and xis, two ELink interfaces for traffic entering the exchange block from the trunk for south-going and north-going traffic respectively. Note that since south going traffic in the trunk router passes the north interface, xin first, it enters here, and not via xis. Vice versa for north-going traffic.
tlinkrx interfaces, and tlinktx interfaces for communicating with the time deterministic interconnect.

The operative state of each exchange block context is managed by an Exchange Sequencer unit (XSEQ). In the DISABLED state, the context does not initiate TLink or ELink packets. Any TLink packets received are dropped silently and ELink packets are dropped with an error. A write to the 'EN' field of the control and status register causes the exchange block context to transition to the COMMIT state. In the COMMIT state, the context may receive ELink ETWR packets to be converted to TLink XTWR packets and distribute tot eh correct tiles. The context must also prepare to receive an exchange request (XREQ) packet from a single tile processor nominated in an exchange block control register by switching the TLink MUX to point at the nominated tile.

The tile processor hardware may implement the following behaviours to operate correctly with the exchange blocks:
The tile processor sets $INCOMING_MUX to listen to its parent exchange block prior to issuing any sync request that may result in it receiving data externally and/or that will leave the control program in a state where it has external data to send.
When $INCOMING_MUX is set to listen to any external spine bus (as opposed to another tile processor), then the tile processor shall enter TLINK_EXCHANGE_MODE in which all received data at the output of its incoming mux is treated as TLink packets. When $INCOMING_MUX is set to listen to another tile processor then the tile processor enters HEADERLESS_EXCHANGE_MODE in which all received data at the output of its incoming mux is treated as header-less internal exchange data.
In TLINK_EXCHANGE_MODE the tile processor shall recognise XFC packets arriving on its incoming mux and shall be able to decode the XFC packet to determine whether it has been selected or deselected by the XFC packet. Either way it will maintain a single bit of architectural state, that reflects the XFC selection state (0b for deselected/XOFF, 1b for selected/XON).
A tile processor that is designated as being responsible for dispatching an XREQ packet to initiate an external exchange shall be capable via some means of unilaterally setting its XFC state to XON in order that it may send the XREQ packet, following which this tile processor should again be subject to XFC flow control from its exchange block. The exact means of doing this shall be defined by the tile architecture and shall not place any requirements on the exchange block to achieve this.

In addition to setting $INCOMING_MUX as above, if the tile expects to receive data following the above sync request it must set its $INCOMING_COUNT register to the number of words it expects to receive from external sources including any words that will be received as a result of the issuance of PCI read (XPRD) requests.

In TLINK_EXCHANGE_MODE, all received tile write (XTWR) packets shall decrement $INCOMING_COUNT and shall not increment $INCOMING_ADDR. The only kind of data packet a tile processor can receive in this mode in an XTWR, of payload length between 4 and 256 bytes.

If a tile processor receives a TLINK_EXCHANGE_MODE packet when its $INCOMING_COUNT is 0 or where $INCOMING_COUNT is not equal to or greater than the packet payload length, then this packet shall be discarded, and an appropriate exception raised by the tile processor.

The tile processor must be capable of recognising incoming XTWR packets which have a TILE ID that matches the tile processor's TILE ID at its incoming mux and ensure that these are written to its own memory at the location specified in the address field of the XTWR packet header. The value in $INCOMING_ADDR is not to be used in determining this location.

The tile processor must arrange its code, transmission data and buffers for received data such that incoming XTWR packets do not create bank conflicts with instruction fetch or TLink packet transmission.

Following setup for TLINK_EXCHANGE_MODE as per above, the tile is free to issue SENDs that dispatch TLink XTWR, XPWR and XPRD packets to its XB. In the event that the tile has not been selected by an XFC packet from the XB, or if it has been deselected by an XFC packet where it was previously selected, that SEND shall pause. The TP is not required to transmit the entire packet contiguously and there may be gaps between one header word and another, between header and payload words, and between payload words.

A SEND that has already begun when a tile becomes deselected by an XFC packet shall not be paused but any subsequent SEND shall be.

TP hardware that dispatches part or all of a TLink packet shall ensure that for each word of the packet, the East Valid, West Valid and Bus Invert bits of its spine bus are all set to 1b.

The tile processor software may implement the following behaviours to operate correctly with the exchange block:

The tile processor must mark its last transmitted packet by setting the LAST bit of the TLink packet header.

The tile processor must mark one transmitted packet by setting the PEN bit of the TLink packet header. The PEN packet indicates to the exchange block that it may XON the next tile in the exchange sequence and XOFF the current tile so the compiler must ensure that the LAST packet it issues will leave the tile before the XOFF packet arrives. The compiler must also ensure that packets transmitted by the next tile in the exchange sequence will not arrive at the exchange block before the LAST packet from the current tile has completed. If the tile only sends one packet it shall set both the PEN and LAST bits of the TLink header.

The tile processor should not attempt to send more than one Tlink packet with one send instruction. If this rule is violated overflow the XB dispatch buffer may result due to the fact that the Tile HW will be sending N 32 bit words, but the XB flow control operates on a TLink packet basis.

Figure 6:
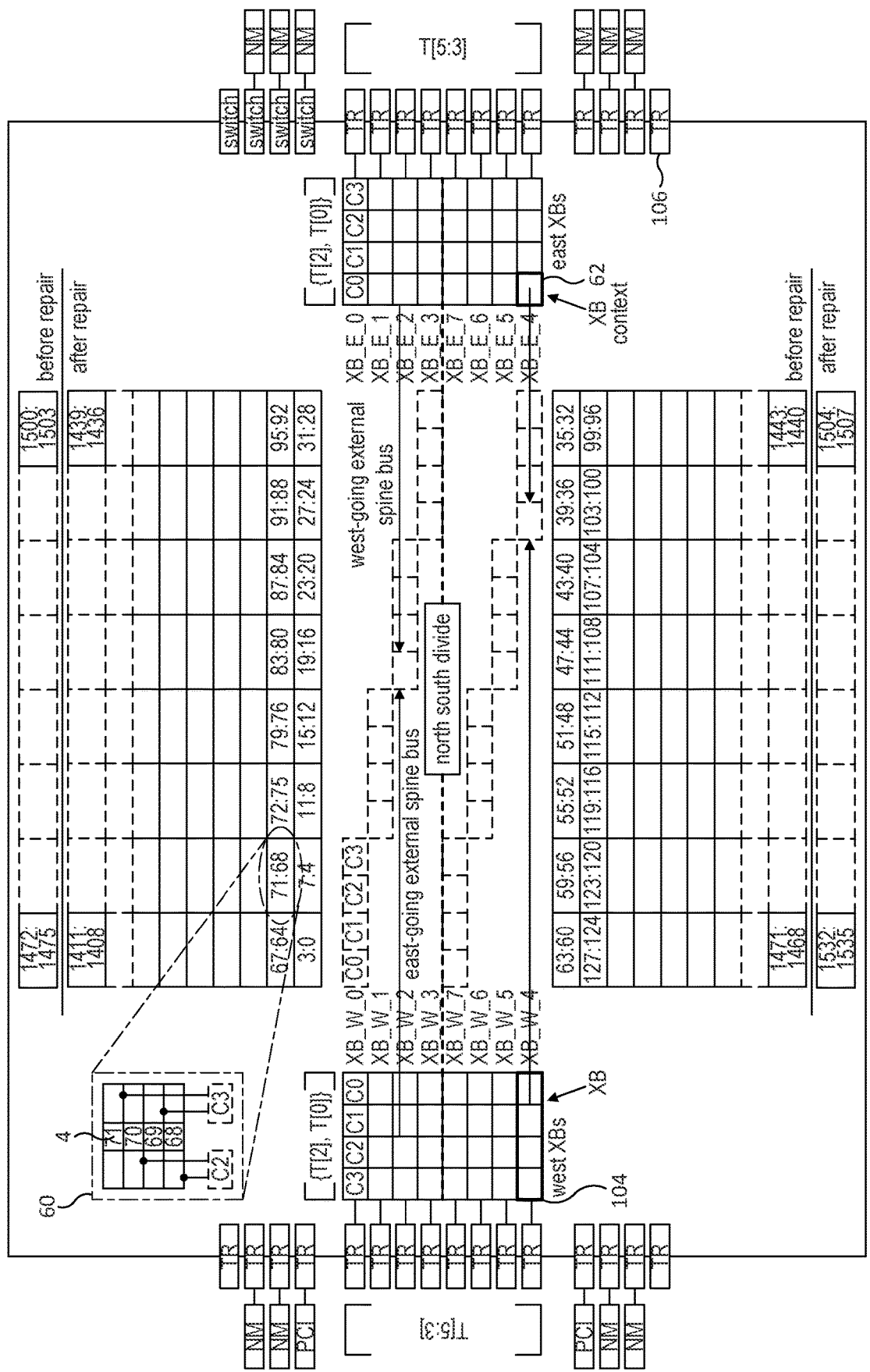
FIG. 6 is a schematic diagram showing the access of tiles of an IPU by exchange blocks.

FIG. 6 shows the access of tiles by exchange blocks 104. Each exchange block 104 connects to two columns of tiles in either the north or south of the IPU. The tiles are grouped into supertiles 60, each comprising four tiles. Each supertile 60 is denoted in FIG. 6 by a block within the sets of tiles located in the north and south of the IPU, labelled with the range of tiles making up that supertile. For example, the supertile 60 comprising tiles 68 to 71 is labelled 71:68.

FIG. 6 also shows each exchange block 104 subdivided into four contexts 602 (C0 to C4), each of which manages half the tiles in one of the two columns that the exchange block can read data from over the interconnect. For example, as shown in FIG. 6, the supertiles 60 labelled 7:4 and 71:68 are in the same column, and each of contexts C2 and C3 associated with exchange block 104 0 control half of the tiles of this column. In a given column, the first context controls the even numbered tiles in that column and the second context controls the odd numbered tiles, and they alternate in this sequence to the top of the column. This is shown in FIG. 6 for tiles 71:68, where the context C2 controls tiles 68 and 70, and the context C3 controls tiles 69 and 71.

Tile memory is accessible via the exchange using the broadcast bitmap of 16 bits with each bit corresponding to one IPU, an 11-bit TILE ID and an 18-bit TILE ADDRESS. The exchange network uses these to route packets to the right place within a set of one or more IPUs. Tile requests for PCI are automatically sent to the PCI complex. If there are two PCI complexes active the MSB (most significant bit) of the ELink PCI Address field is used. The broadcast bitmap field in an ETWR packet identifies one or more IPUs in a multi-IPU system.

Bits 5:0 of the TILE ID are used to direct packets as follows:

Bits 5:3 of the TILE ID select a given exchange block 104.

Bit 2 of the TILE ID selects between the least significant and most significant column assigned to an exchange block 104, thus selecting two of the possible exchange block contexts 602 (those assigned to the selected column).

Bits 1:0 of the TILE ID select one of four tiles within a given group of four tiles (supertile).

Bit 0 defines which of the two possible exchange block contexts the selected tile belongs to.

The TILE ADDRESS is used to specify the memory location to access within the selected tile.

Packets cannot be routed from a west edge exchange block to an east edge exchange block or vice versa. Packets may route from the west edge of one IPU to the end of the line of west edge trunk routers 106 on that IPU, then along the cross-link along north and south edges. These packets must be routed out of an IPU link on the east edge to the east edge of a neighbouring IPU.

The above-described network configuration is useful in the context of an interconnected network acting as an accelerator for machine learning workloads. Each IPU may be considered as a processing node, and they are interconnected in the manner which enables machine learning collectives to be efficiently implemented. One particular application is to update models when training a neural network using distributed processing. In this context, distributed processing utilises multiple processing nodes and the transmission of data between the processing nodes using messages exchanged over physical links between the processing nodes.

Figure 7:
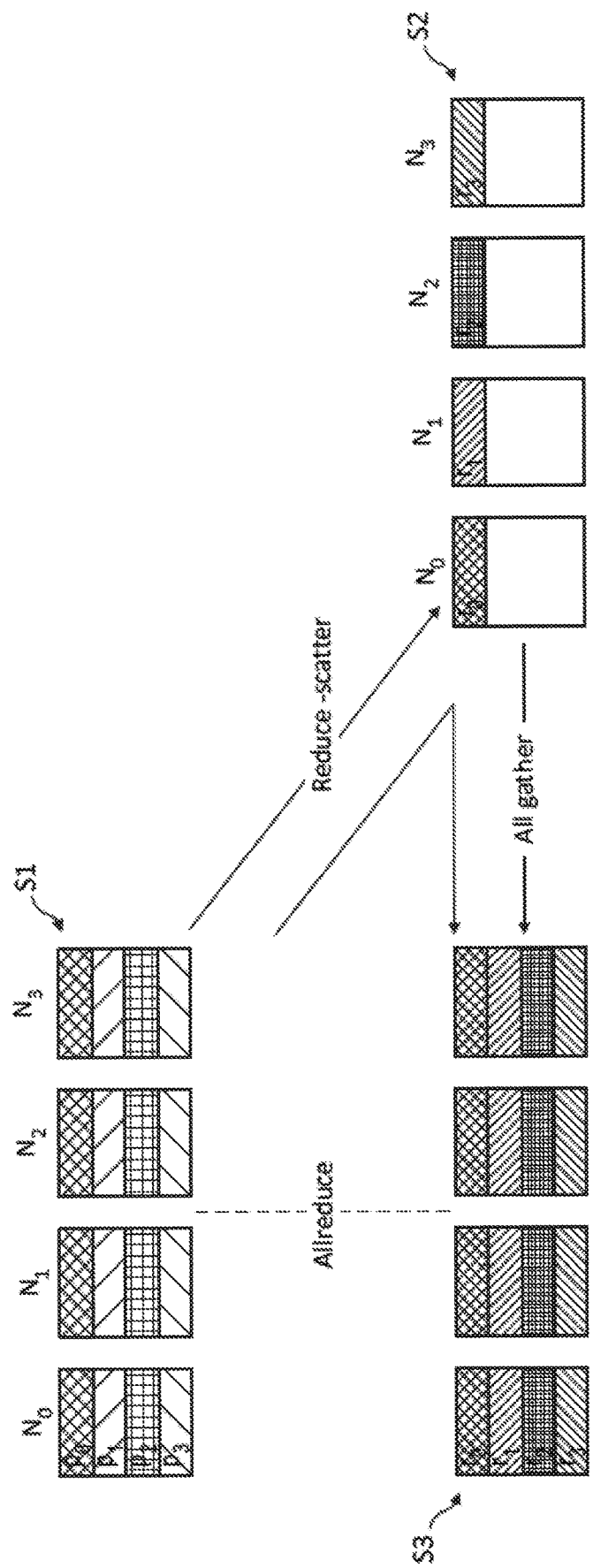
FIG. 7 is a schematic diagram illustrating implementation of an Allreduce function by a reduce-scatter step followed by an Allgather step.

In ML workloads, inter-node communication is currently dominated by broadcast and Allreduce collectives. The broadcast collective can be implemented by a scatter collective followed by an Allgather collective, and the Allreduce collective can be implemented by a Reduce-Scatter collective followed by an Allgather collective. The Allreduce collective is illustrated in FIG. 7.

The Allreduce collective has been described above and is illustrated in FIG. 7. FIG. 7 shows a set of partial values or "partial" vector $P_0$, $P_1$, $P_2$, $P_3$ on each of four nodes in a starting state 51. In this context a node is a processing node in a network of processing nodes. Note that each node No, $N_1$, $N_2$, $N_3$ has four "corresponding" partials which are marked accordingly (large diamond grid, wide downward diagonal stripe, large square grid, wide upward diagonal stripe). That is, each partial has a position in its partial vector such that P0(n) has the same position in its vector on node n as P0 (n+1) in its vector on node n+1. The suffix (n) is used to denote the node in which the partial resides—thus, P0(0) is the partial P0 on node NO. In a reduce-scatter pass, corresponding partials are reduced, and the reduction provided to one of the nodes. For example, partials P0(0), P0(1), P0(2), P0(3) are reduced (to $r_0$) and placed onto node No. Similarly, partials P1(0), P1(1), P1(2) and P1(3) are reduced (to $r_1$) and placed onto node N. And so forth so that in an intermediate state S2, each node has one of the reductions $r_0$, $r_1$, $r_2$ and $r_3$. As explained, the reduction may be by any combinatorial function f ($Pi_0^3$)—which could include independent operators (e.g. max) or associative operators=P1(0) *P1(1)*P1 (2)*P1(3). Then, in an Allgather pass, each reduction is provided to all nodes to activate a state S3 wherein each node now holds all four reductions. Note that in S1, the "corresponding" partials, e.g. P0(0), P0(1), P0(2) and P0(3) may all differ whereas, in state S3, each reduction, e.g. $r_0$, is the same at all nodes, where $r_i$=f{($P_i$(0), $P_i$(1), $P_i$(2) and $P_i$(3))}. In machine learning, the set of partials P0, P1, P2, P3 is a vector. A vector of partials (e.g. updated weights) is produced on each pass of the model during training. The reduction $r_0$, $r_1$, $r_2$, $r_3$ on diamond grid, downward diagonal stripe, square grid, upward diagonal stripe each node in state S3 is the full reduction vector that is the vector of "results" or fully reduced partials. In the context of machine learning, each partial could be an updating delta for a parameter in the model. Alternatively (in an arrangement not described further herein) it could be an updated parameter.

Figure 8A:
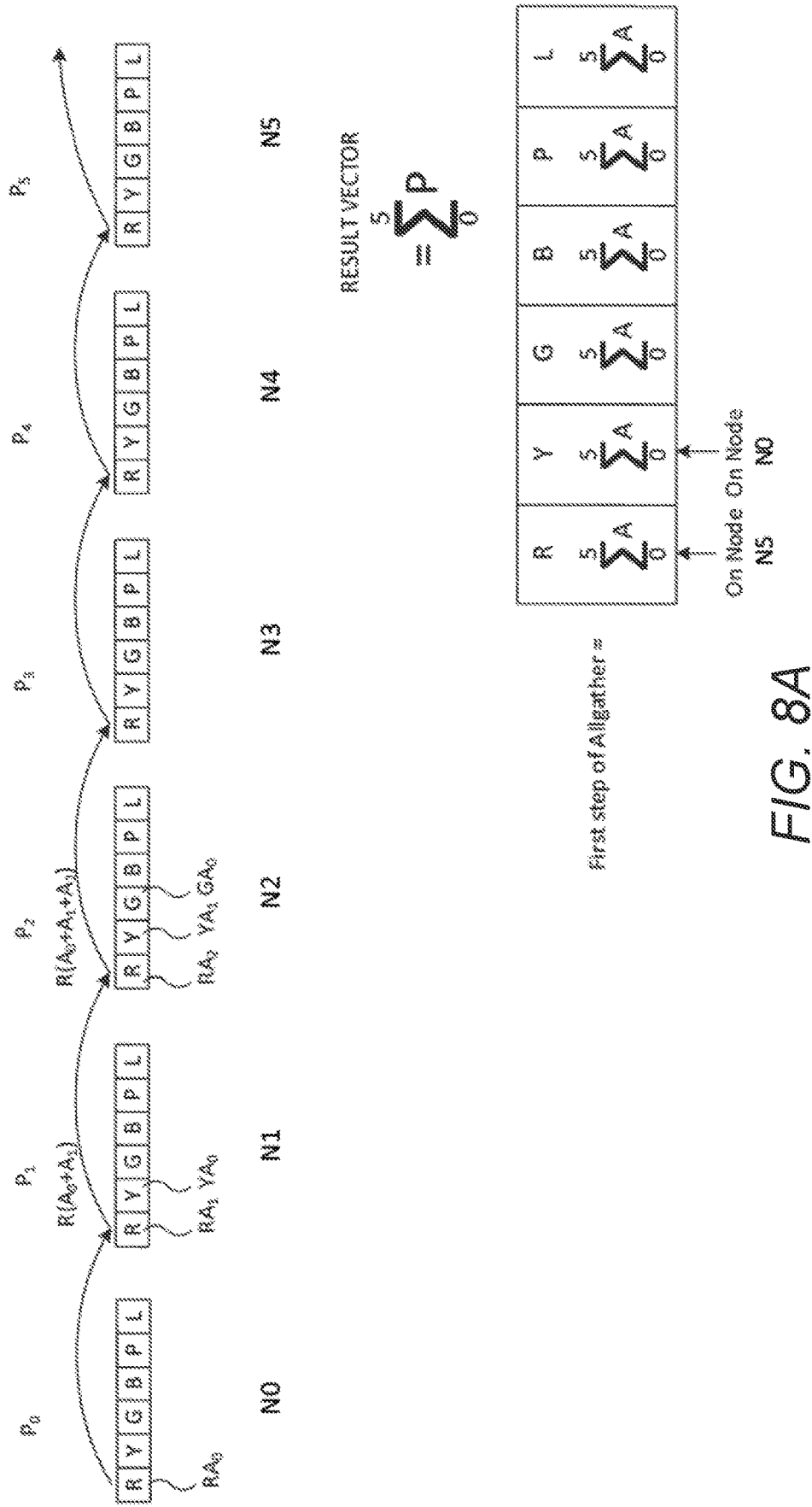
FIGS. 8A and 8B illustrate a bucket based Allreduce algorithm.
Figure 8B:
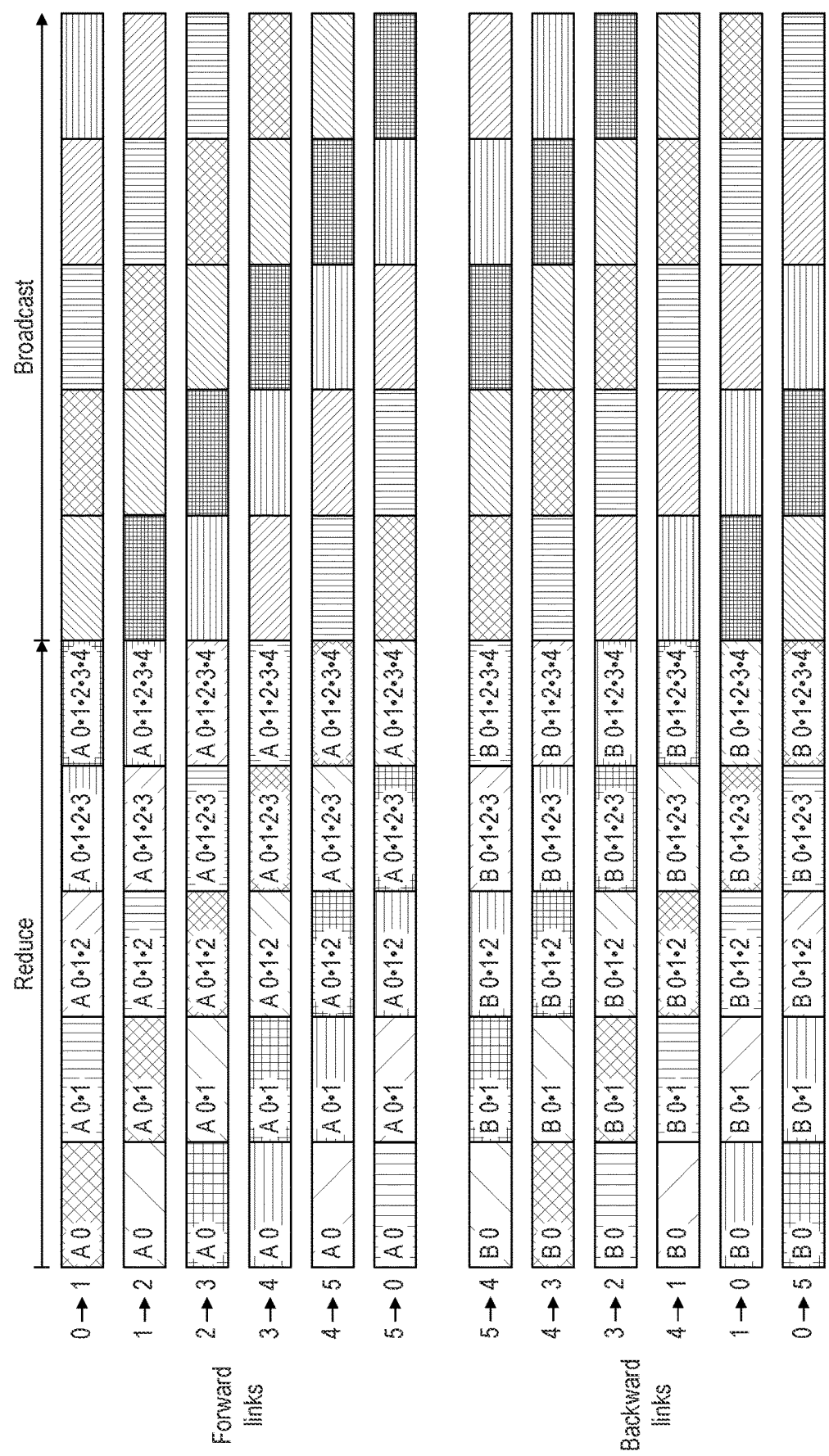

FIGS. 8A and 8B illustrate a bucket-based algorithm for reduce-scatter/Allgather that assumes six "virtual" rings. These are also termed "logical" rings herein. FIG. 8A is a schematic diagram illustrating the reduction of partials in multiple virtual rings. Each partial is split into six fragments. In FIG. 8A, the capital letters R, Y, G, B, P, L each denote a different fragment of a partial stored at each node, indicated by hatching diamond grid, upward diagonal stripe, square grid, horizontal stripe, downward diagonal stripe, vertical stripe. The letters denote corresponding fragments which are to be reduced with each other, and define the "virtual" or "logical" ring for those fragments. Looking at FIG. 8A, the "R" fragments in each of the partials P0, P1, P2, P3 and P4 are reduced into a single fragment in the result vector ($R\Sigma A_0^5$); similarly for the Y, G, B, P and L fragments.

FIG. 8B shows a timing diagram with time on the horizontal axis indicating the data exchanges and computations in each step of the Allreduce process. In FIGS. 8A and 8B, the Allreduce process is accomplished by a reduce-scatter phase followed by an Allgather phase. In FIG. 8B each of the fragments are denoted by different hatching as follows: R—diamond grid, Y—upward diagonal stripe, G—square grid, B—horizontal stripe, P—downward diagonal stripe, L—vertical stripe.

The notation in FIGS. 8A and 8B is as follows. The partials are each denoted P0, P1, P2, P3, P4, P5. At the start of the process, each partial is stored on a respective node N0, N1, N2, N3, N4, $N_5$. Each fragment is labelled according to its fragment ordinant and its position in the virtual ring in which it is deemed to be reduced. For example, RA0 denotes the R fragment in partial P0, because this is the first fragment in a virtual ring formed by nodes N0-N1-N2-N3-N4-N0. RA1 denotes the R fragment at node N1, which is in the second position in its virtual ring. YAO denotes the Y fragment at node N1. The "O" suffix indicates it is the first fragment in its virtual ring, the Y-ring being N1-N2-N3-N4-N0-N1. Note in particular that the suffixes on A reflect the virtual rings, and do not correspond to the physical nodes (or the partials). Note that FIG. 8A shows only the virtual rings on the forward links. FIG. 8B shows that an equivalent process is occurring on the backward links, with the fragments denoted as B.

In step one, the first fragment (the A0) in each virtual ring is transferred from its node to the next adjacent node where it is reduced with the corresponding fragment at that node. That is, RA0 moves from N0 to N1 where it is reduced into R(A0+A1). Once again, the "+" sign is used here as a shorthand for any combinatorial function. Note that in the same step the A0 fragments of each virtual ring will simultaneously be being transmitted. That is, the link between N1 and N2 is used to transmit YAO, the link between N2 and N3 is used to transmit GAO et cetera. In the next step, the corresponding reduced fragments are transmitted over the forward links to their next adjacent node. For example, R(A0+A1) is transmitted from N1 to N2, and Y(A0+A1) is transmitted from N2 to N3. Note that for reasons of clarity not all fragments are numbered, nor are all transmissions numbered in FIG. 8A. The full set of fragments and numbers are shown in FIG. 8B. This process carries on for five steps. After five steps, there is a reduction of all fragments on each node. At the end of the fifth step, this reduction is on the last node of each corresponding ring for that fragment. For example, the R reduction is on node N5.

The beginning of the Allgather phase starts by a transmission from the last to the first node in each virtual ring. Thus, the final reduction for the R fragments ends on node N5 ready for the first step of the Allgather phase. The final reduction of the Y fragments correspondingly ends up on the node NO. In the next step of the Allgather phase, the reduced fragments are transmitted again to their next adjacent node. Thus, the fully reduced R fragment is now also at N2, the fully reduced Y fragment is now also at N3 and so on. In this way, each node ends up at the end of the Allgather phase with all fully reduced fragments R, Y, G, B, P, L of the partial vector.

Implementation of the algorithm is optimal if the computation required for the reduction can be concealed behind the pipeline latency. Note that in forming suitable rings in a computer for implementation of Allreduce, a tour of the ring must visit each node in the ring only once.

The Barley Twist configuration described above represents an improved topology for an interconnected network of processing nodes which permits an efficient exchange of partials and results between processing nodes to implement an Allreduce collective.

Figure 9:
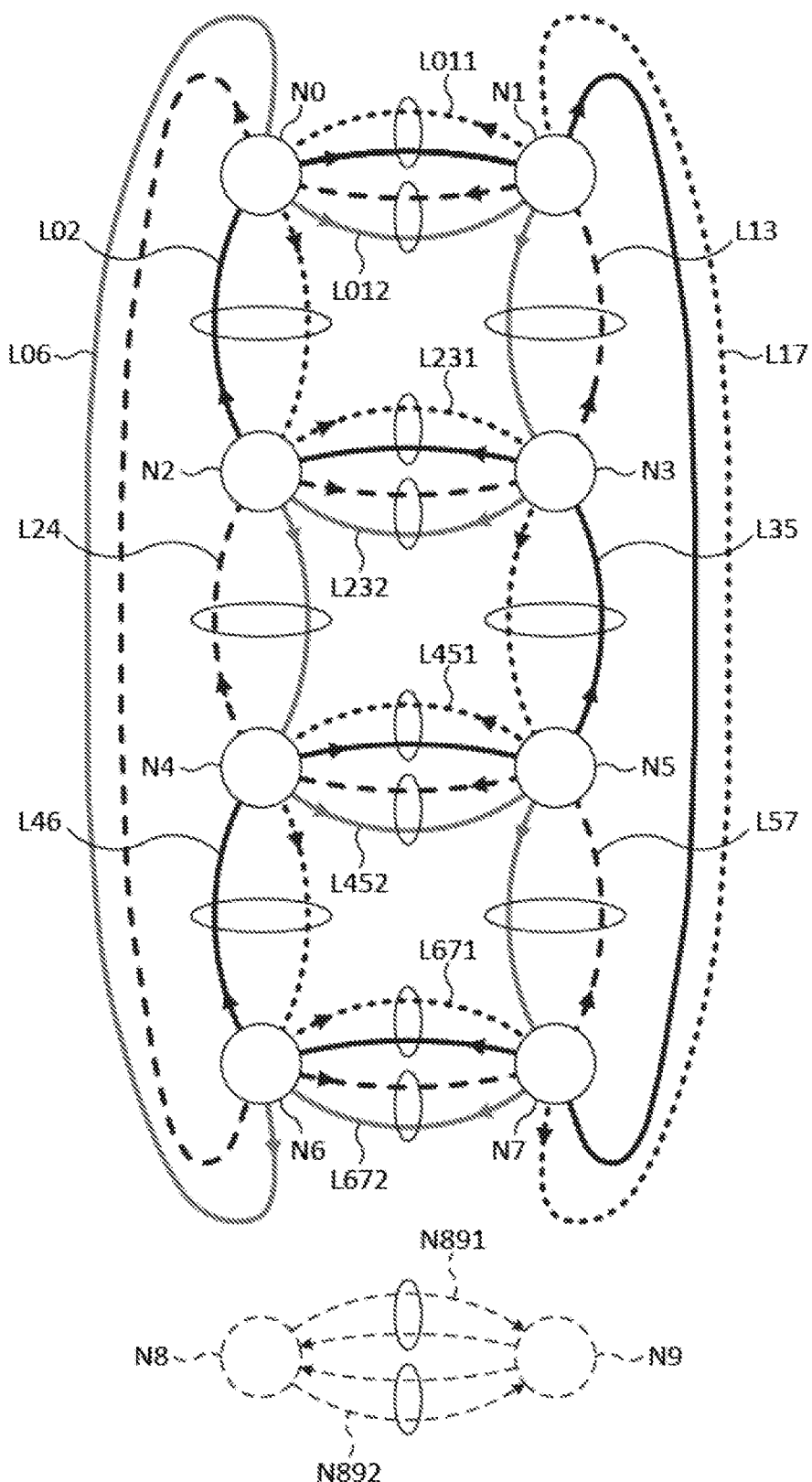
FIG. 9 is a schematic diagram of a configuration of processing nodes and links forming a ladder.
Figure 9A:
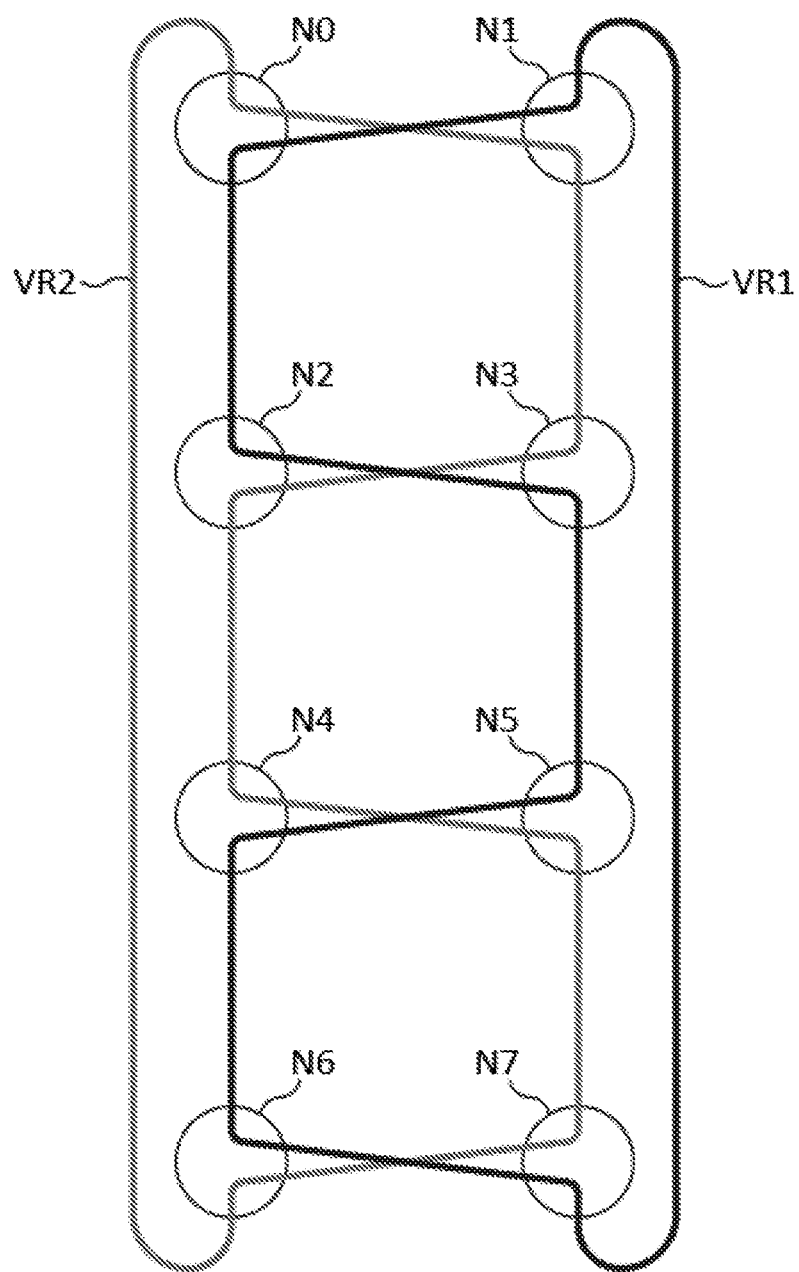
FIG. 9A is a schematic diagram of a configuration of processing nodes in which rings are embedded.

FIG. 9A is a schematic diagram showing a connected topology of multiple processing nodes. In FIG. 9A, there are eight processing nodes in a ladder formation, but it will be appreciated that the principles could be extended to any number of pairs of processing nodes arranged in a ladder. Each processing node is shown as a circle and labelled with a number for ease of reference. In the following description, the prefix N will be inserted when referring to a node. For example, N0 denotes the circle representing node N0 in FIG. 9A. The processing nodes are connected by links in a manner to be described. Each link may be bi-directional, that is, it may transport data in both directions over the links. Note that there is a physical interconnectivity, and a logical connectivity. The logical connectivity is used to form two embedded, continuous rings, each having two directions. The physical connectivity of interconnected IPUs has been described above, and is expanded on in the following. Processing nodes in the Y direction are each connected to their neighbouring node by a single bidirectional link. Facing processing nodes are connected by two bi-directional links. For example, (looking at the left hand vertical in FIG. 9A), N0 is connected to N2 by a single bi-directional link (shown as two oppositely facing arrows in FIG. 9). Similarly, N2 is connected to N4, N4 is connected to N6 and N6 is connected back to N0. In the horizontal direction, node N0 is connected to N1 by two bi-directional links (one of which is shown by opposing arrows in black and small dash, and the other of which is shown by opposing arrows in grey and large dash). Similarly, N2 is connected to N3, N4 is connected to N5 and N6 is connected to N7. This physical connectivity allows two logical embedded rings (each bi-directional) to be embedded in the structure. The first ring (shown in grey and large dash) extends from N0 to N1, N1 to N3, N3 to N2, N2 to N4, N4 to N5, N5 to N7, N7 to N6 and back to N0. The second logical ring (shown in black and small dash) extends from N0 to N2, N2 to N3, N3 to N5, N5 to N4, N4 to N6, N6 to N7, N7 to N1 and from N1 back to N0. Each ring comprises all eight processing nodes. Note also that the two rings can be used simultaneously because there is no conflict on any single path.

Consider node N0 in FIG. 9A. This node N0 has two links which connect it to a node N1 which is referred to as its facing pair node. These links are labelled L011 and L012. The designation of L01 is to indicate that the link connects nodes 0 and 1. The designation 1 indicates that it is the first link between nodes 0 and 1, and the designation 2 denotes that it is the second link between nodes N0 and N1. Note that in this embodiment each of the links are bidirectional. The node N0 also has a third bidirectional link which is labelled L02. This link L02 is connected to a corresponding node N2 in the next adjacent pair in the ladder configuration. The link L02 is referred to as a ladder connecting link for this reason. The node N0 has a fourth link labelled L06. This link connects corresponding nodes N0 and N6 in end pairs of the ladder configuration. In FIGS. 9A and 9B, the first end pair is the facing pair of nodes N0 and N1, and the second end pair are the facing nodes N6 and N7. Note that the processing nodes in the facing pair N6, N7 are similarly connected by two bidirectional links L671, L672.

The link L06 which extends between corresponding nodes of the end pairs (N0 and N6), and correspondingly link L17 which extends between nodes N1 and N7 are referred to as ladder return links. The links enable each embedded ring in the ladder configuration to be a full one-dimensional ring.

The ladder configuration in the embodiment of FIG. 9 comprises two intermediate facing pairs, N2/N3 and N4/N5. The facing nodes in each pair are connected by corresponding links L231, L232; L451, L452.

Corresponding nodes in the facing pairs are connected through ladder connecting links. For example, the node N1 in the first end pair is connected to the node N3 and its adjacent intermediate pair by link L13. In FIG. 9A, each link is shown by two bidirectional arrows. These may, however, be accommodated in a single physical link structure, and denote the bidirectional communication paths over that physical link structure. In alternative embodiments, each direction of a link structure may be a separate physical manifestation. In the embodiment of FIG. 9A, four facing pairs of eight nodes in total form a ladder configuration. It will readily be appreciated that the ladder configuration may be simply extended to include further facing pairs. This may be done by changing the connectivity of the links on the nodes in the end pair. For example, to add another facing pair to the ladder configuration, the link L06 is disconnected from node N0 and connected to a further node N8 (shown in dotted). This node N8 has its own physical link which is then connected as the ladder return link to node N0. Similarly, the link L17 extending from node N7 to node N1 is disconnected from node N1 and connected to a new node N9 (shown in dotted). A physical link from N9 is then connected as the ladder return link node N1. The nodes N8 and N9 are connected together by physical links N891 and N892.

Further pairs of nodes may be added to the ladder configuration as needed to expand the processing capability of the computer. Note that when the new nodes are added, there is no need to interrupt the existing connectivity for the other pairs of nodes in the ladder configuration, apart from the end pair. This greatly simplifies extension of the ladder configuration to include additional processing nodes as desired.

In order to use this structure, the partial (or fragment) to be transmitted is split into two parts at each node, and each part is all reduced around one of the rings using the one-dimensional ring algorithm which has been described above the reference to FIGS. 8A and 8B. Each node outputs $$\frac{n-1}{n}(v)$$

size of fragment, where n is the number of nodes, and v is the size of the data structure that is being reduce-scattered or Allgathered in a particular phase. At the beginning, v is the size of the partial vector. The number of fragments equals the number of nodes in the ring before each step around the ring.

The PCIe interface (the peripheral component interconnect express) interface is an interface standard which can be used to operate a SERDES link between the IPUs. SERDES is an acronym for Serial/Deserialiser, and is a link which has the power requirement which is independent of the amount of data that is carried over the link, or the time spent carrying that data. In order to transmit a single on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level rather than by a variation between 0 and an applied voltage level. Thus, there is a fixed power for a bandwidth capacity on a SERDES link whether it is used or not.

An aim of the interconnections described herein, and the manner in which they are used, is to have sufficient bandwidth to conceal inter-node communication behind the computations carried out at each node for distributed machine learning.

The concepts and techniques described herein are particularly useful because they enable optimum use to be made of non-switchable links between the IPUs. A configuration may be brought by connecting up the processing nodes as described herein using fixed non-switchable links between the nodes.

Alternatively, links may be provided between processing nodes, but may be permanently deactivated in certain configurations.

In order to use the configuration, a set of parallel programs are generated. The set of parallel programs contain node level programs, that is programs designated to work on particular processing nodes in a configuration. The set of parallel programs to operate on a particular configuration may be generated by a compiler. It is the responsibility of the compiler to generate node level programs which correctly define the links to be used for each data transmission step for certain data. These programs include one or more instruction for effecting data transmission in a data transmission stage which uses a link identifier to identify the link to be used for that transmission stage. For example, a processing node may have two or three active links at any one time (double that if the links are simultaneously bidirectional). The link identifier causes the correct link to be selected for the data items for that transmission stage. Note that each processing node may be agnostic of the actions of its neighbouring nodes—the exchange activity is pre compiled for each exchange stage.

Note also that links do not have to be switched—there is no need for active routing of the data items at the time at which they are transmitted, or to change the connectivity of the links.

As mentioned above, the configurations of computer networks described herein are to enhance parallelism in computing. In this context, parallelism is achieved by loading node level programs into the processing nodes of the configuration which are intended to be executed in parallel, for example to train an artificial intelligence model in a distributed manner as discussed earlier. It will be readily appreciated however that this is only one application of the parallelism enabled by the configurations described herein. One scheme for achieving parallelism is known as "bulk synchronous parallel" (BSP) computing. According to a BSP protocol, each processing node performs a compute phase and an exchange phase which follows the compute phase. During the compute phase, each processing nodes performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using the MPI message passing standard. For example, a collective may be recalled from a library, such as the Allreduce collective. In this way, the compiler has precompiled node level programs which control the links over which the partial vectors are transmitted (or respective fragments of the partial vectors are transmitted).

It will readily be apparent that other synchronisation protocols may be utilised.

A fuller description of the operation of the exchange block and time deterministic interconnect will now be provided. Further details are given in GB Publication NO 2569844 the contents of which are herein incorporated by reference. When there is an external exchange to perform between tiles 4 on different chips 2, software (program code portions) running on at least one of the tiles 4 sends an external exchange request message (XREQ) to one of the exchange blocks 104 to which it is connected via the interconnect. The exchange request may be sent as a control packet over the same data path 218, 140$_x$,140 [FIG. 11]301 as used to exchange data (i.e. data content). However, it is not excluded that it could be signalled over a separate control path built into the external interconnect. In embodiments, a single one of the tiles 4 sends the exchange request on behalf of all the tiles 4 with data to send externally (off-chip) in a current exchange phase (e.g. an exchange phase of a BSP superstep), or at least all of those within a certain group (which, in some embodiments may be a synchronisation group). The compiler determines which tile 4 is to send the exchange request on behalf of which others and complies the software on the responsible tile 4 with a suitable instruction or instructions to send the exchange request. This may be possible for example because the system is running a pre-compiled static graph.

The exchange request message(s) tells the appropriate exchange block 104 servicing that tile which tiles 4 have data content to exchange externally in the current exchange phase. The exchange block 104 starts with one of these indicated tiles 4 by sending an "exchange-on" message (XON) to that tile 4. In response, the tile 4 in question begins transmitting data packets over the external interconnect via the trunk router and relevant link interface each indicating a destination tile 4 in a header of the packet. Each exchange block 104 comprises a queue (FIFO buffer) arranged to receive and buffer the packets sent over the external interconnect. At the other end of the queue each exchange block 104 routes the packets to their destination based on their headers. Once the currently transmitting tile 4 has sent its last packet, the exchange block 104 sends an exchange-off (XOFF) message to that tile 4 (the exchange block 104 can determine that a given packet is the last packet from a given tile 4 based on a 'last packet' flag in the packet header emitted by the tile). The exchange block 104 then sends an exchange-on message to the next tile 4 indicated in the exchange request(s) as having data to send, and so forth until all the indicated tiles 4 have sent all the packets they had to send in the current exchange phase. The exchange-on and exchange-off messages may be sent as control packets over the same data path 218, 140 as used to exchange data (i.e. data content). Alternatively, it is not excluded that they could be signalled over a separate control path built into the external interconnect.

In some embodiments the exchange mechanism does not distinguish between transmission from external tiles 4 and external sources other than tiles 4, or at least does not exclude transmissions from other such sources. For example, such other external sources could comprise the host 93 [shown in FIG. 1], and/or one or more other external sources such as an external storage drive, network card, etc. In such cases the exchange request (XREQ) from one of the tiles 4 (e.g. as determined by the compiler) may also specify one or more of the other external sources, e.g. host 93.

Thus, each tile 4 is advantageously provided with a mechanism to exchange data between domains that are non-time-deterministic or asynchronous with respect to one another.

Figure 10:
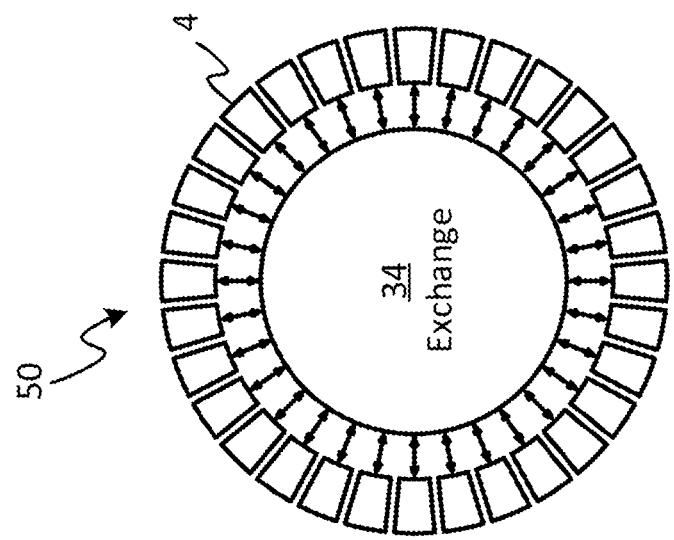
FIG. 10 is a schematic illustration of a bulk synchronous parallel (BSP) computing model.
Figure 10:
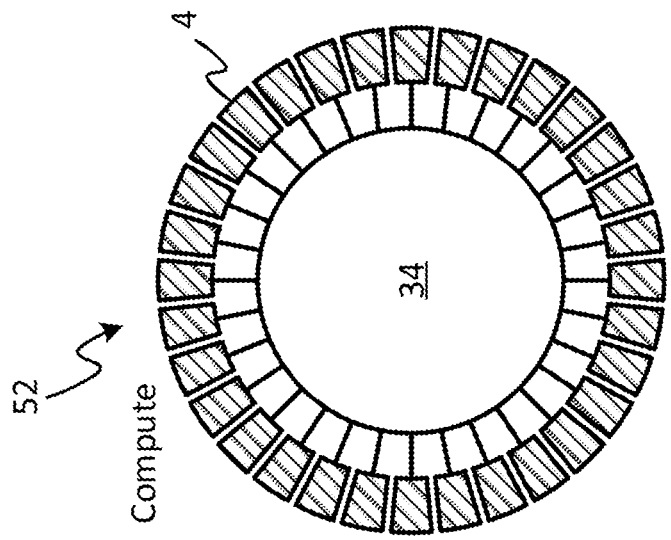

In some embodiments the disclosed mechanism may be used to implement a BSP scheme. As illustrated in FIG. 10, in a BSP scheme, the system operates in an alternating cycle of exchange phase 50 and a compute phase 52. In each cycle, the exchange phase 50 comprises a respective exchange phase on each tile 4, and the compute phase 52 comprises a respective compute phase on each tile 4. In the present case a barrier synchronization 30 is placed between the compute phase 52 and next exchange phase 50 each cycle. I.e. all the tiles 4 are required to complete their respective compute phase 52 before any is allowed to proceed to the next exchange phase 50. In some embodiments this may be implemented by a synchronization mechanism, for example as described in GB Publication No. 2569844.

When a given tile 4 has completed its current respective exchange phase 50, it can proceed directly to its next compute phase 52—it does not need to wait for all the other tiles 4 to complete their exchange phases. Nonetheless, the compute phase 52 on the given tile 4 may still be dependent on receiving data from one or some other tiles 4 and/or other external sources. For data from tiles 4 on the same chip, the program can time any dependent computations relative to the known exchange timing of the time-deterministic interconnect (discussed in more detail herein with respect to FIG. 11).

Note: for the sake of illustration, the above discussion has assumed that every exchange involves an external exchange between at least some tiles 4 on different chips 2. In the fact the BSP behaviour may be split into internal and external domains.

Figure 11:
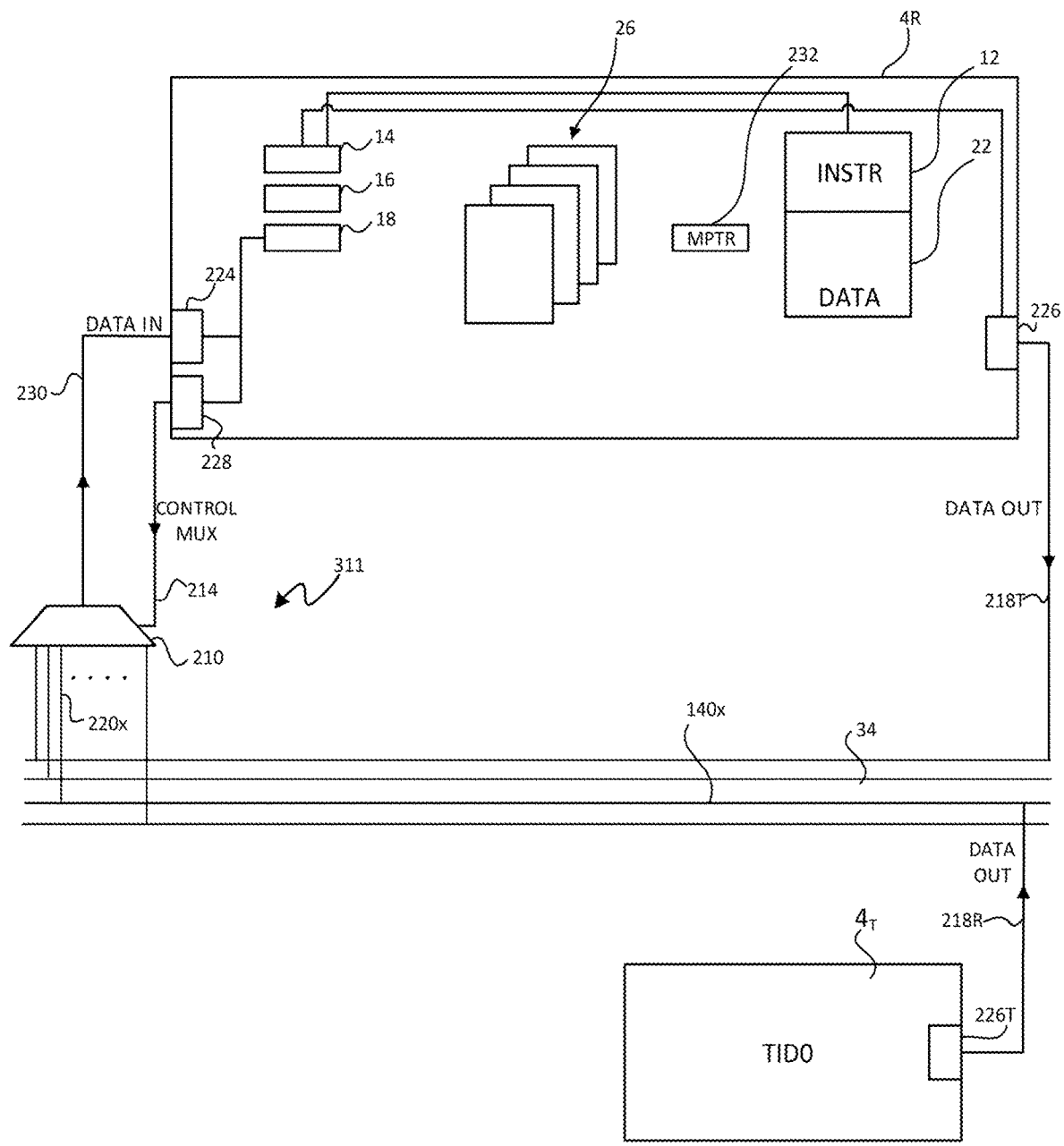
FIG. 11 is a schematic diagram of an arrangement for exchanging data between tiles.
Figure 12:
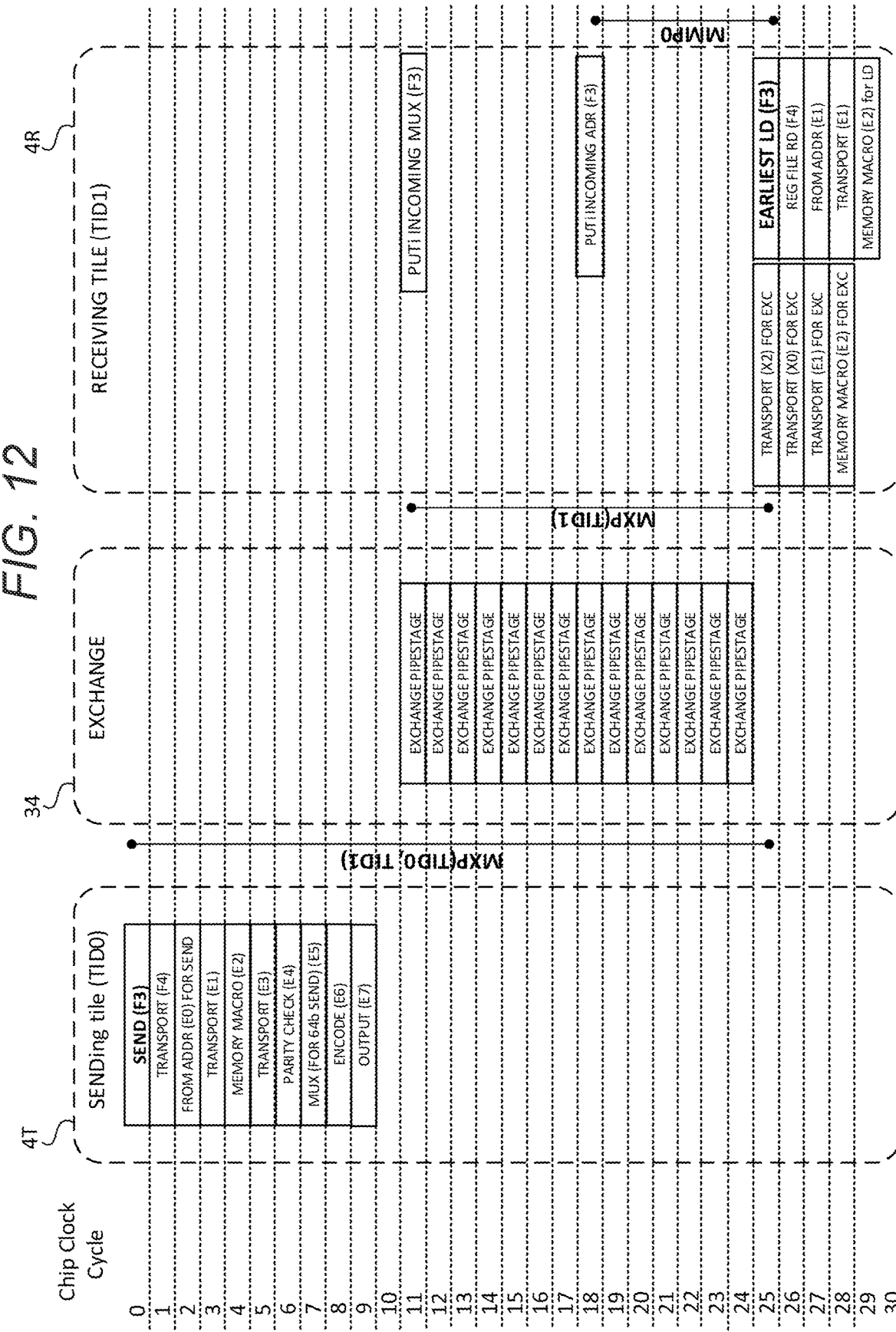
FIG. 12 is a diagram showing the relative timing of issuing instructions on transmitting and receiving tiles.

In some embodiments, exchange of data via the internal (on-chip) interconnect 34 can be made time deterministic, as will be discussed in more detail shortly with reference to FIG. 11, whereas exchange of data via an external interconnect may be non-time-deterministic, e.g. due to a lossy physical channel which will require retransmission of messages. In general, an external interconnect could be made time-deterministic, but it may be difficult to do so or might confer too little advantage over a non-deterministic interconnect, and so may not be implemented in practice.

It may be desirable to keep the internal communications time deterministic so that they can be conducted without the need for queues in the internal interconnect 34, since queues would incur an undesirable silicon footprint in the interconnect 34. However, in some embodiments, external communications may not be time deterministic.

In some embodiments, exchange of data on-chip (internal exchange) may be performed in a time-deterministic manner without the need for queues. Reference is made to FIG. 11. The communication without queues can be achieved by the compiler knowing the time at which each tile 4 transmits its data, and also knowing the on-chip inter-tile delay between the transmitting and receiving tile. Given this predetermined knowledge, the compiler can then program the receiving tile to "listen" to the transmitting tile at a specific, known time after the transmission of the relevant data by the transmitting tile, i.e. the transmit time plus the inter-tile delay. The timing of the transmission is known by the compiler because the compiler itself selects at which point in each thread to include the send instruction(s). Further, the inter-tile delay, for on-chip communications, is a fixed knowable value for a given pair of transmitting and receiving tiles 4. The compiler may know this from a look-up table of inter-tile delays for different possible combinations of sending and receiving tiles. The compiler can then include the corresponding receive instruction, to listen to the sender's address, at the corresponding number of cycles after the transmit instruction.

Each tile 4 comprises a respective processing unit 10 comprising an execution unit 13, e.g. pipeline. Each tile 4 also comprises a respective memory 11 comprising a respective instruction memory 12 for storing code to be executed by the respective execution unit 10, and a respective data memory storing data operated on by the respective executed code (data to be operated on by the code, and/or data resulting from the operations). The execution unit 13 comprises a fetch stage 14, decode stage 16 and execution stage 18, preferably arranged in a pipelined manner. The fetch stage 14 controls the issue of machine code instructions from the instruction memory 12 into the rest of the pipeline or execution unit 13, to be decoded and executed by the decode and execution stages 16, 18 respectively. Context register files 26 comprises a respective set of registers for representing the program state of a respective thread.

Each IPU 2 comprises a respective clock which controls the timing of chip activity. The clock is connected to all of the chip's circuits and components. The IPU 2 also comprises the internal, time-deterministic interconnect 34 to which all tiles and links are connected by sets of connection wires. In some embodiments the interconnect 34 may be stateless, in that it has no state readable by software. Each set of connection wires is fixed end to end. The wires are pipelined. Each set can carry a packet consisting of one or more datums, with one datum being transferred per clock cycle. But note herein that the word "packet" denotes a set of bits representing a datum (sometimes referred to herein as a data item), perhaps with one or more valid bit. The "packets" for on chip tile-to-tile communication do not have headers or any form of destination identifier (which permits an intended recipient to be uniquely identified), nor do they have end-of-packet information. Instead, they each represent a numerical value input to or output from a tile. Each tile has its own local memory (described later). The IPU 2 has no shared memory. The interconnect 34 constitutes a cross set of connection wires only and also does not hold any state. Data exchange between tiles on the same chip is conducted on a time deterministic basis as described herein. Each exchange path is a pipelined connection wire comprising a series of temporary stores, e.g. latches or flip flops which hold datum for a clock cycle before releasing it to the next store. Time of travel along the wire is determined by these temporary stores, each one using up a clock cycle of time in a path between any two points. The clock is not shown in FIG. 11.

At the end of a compute phase, once it has been established that each tile 4 is ready to send data, the system enters the exchange phase 50. In this exchange phase, data values move between tiles (in fact between the memories of tiles in a memory-to-memory data movement). In the exchange phase, there are no computations and therefore no concurrency hazards (or at least there are no computations that rely on data yet to be received from another tile 4). In the exchange phase, each datum moves along the connection wires on which it exits a tile from a transmitting tile to its recipient tile. At each clock cycle, each datum moves a certain distance along its path (store to store), in a pipelined fashion. When a datum is issued from a tile, it is not issued with a header identifying a recipient tile. Instead, the recipient tile knows that it will be expecting a datum from a certain transmitting tile at a certain time. Thus, the computer described herein is time deterministic.

Each tile 4 runs a portion of the program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer.

Each tile 4 is associated with its own multiplexer 210. Each multiplexer has at least as many inputs as there are tiles 4 on the chip, each input being connected to the switching fabric 34. The cross wires of the switching fabric are connected to a data-out set of connection wires 218 from each tile (a broadcast exchange bus). For ease of illustration, not all crosswires are shown in FIG. 11. One set of crosswires is labelled 140x to indicate that it is one of a number of sets of crosswires.

When the multiplexer 210 is switched to the input labelled 220x then that will connect to the crosswires 140x and thus to the data bus 218T of the transmitting (sending) tile 4T. If the multiplexer is controlled to switch to that input at a certain time, then the datum received on the data bus 230 which is connected to the crosswire 140x will appear at the output of the multiplexer 210 at a certain time. It will arrive at the receiving tile 4R a certain delay after that, the delay depending on the distance of the multiplexer 210 from the receiving tile 4R. As the multiplexers tend to be arranged close to the switching fabric, the delay from the tile to the multiplexer can vary depending on the location of the receiving tile 4R.

To implement the switching, the local programs executed on the tiles 4 include switch control instructions (PUTi) which cause a multiplexer control signal 214 to be issued to control the multiplexer 210 associated with that tile to switch its input at a certain time ahead of the time at which a particular datum is expected to be received at the tile. In the exchange phase, multiplexers are switched and packets (data) are exchanged between tiles using the switching fabric. It can be seen from this explanation that the internal interconnect 34 has no state and requires no queues—the movement of each datum is predetermined by the particular crosswire to which the input of each multiplexer is connected.

In the exchange phase, all tiles 4 are permitted to communicate with all other tiles within its synchronisation group. Synchronisation groups may be formed of tiles on the same chip or on different chips. Each tile 4 has control of its own unique input multiplexer 210. Incoming traffic can thus be selected from any other tile in the IPU 2 (or from one of the external connection links in an external exchange). It is also possible for a multiplexer 210 to be set to receive a null input, i.e. no input, in any given exchange phase.

Each tile 4 has three interfaces: an "exin" interface 224 which passes data from the switching fabric 34 to the tile 4; an "exout" interface 226 which passes data from the tile to the switching fabric over the broadcast exchange bus 218; and an "exmux" interface 228 which passes the control mux signal 214 (mux-select) from the tile 4 to its multiplexer 210.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler, preferably at compile time, which needs to be aware of the inter-tile delay parameters.

Unlike the packets sent over the internal interconnect 34, packets intended to be transmitted off chip have headers: as the order of transmission can change, they require the destination address to be present in the packet header.

At the physical layer the interconnect mechanism is lossy, but at the transaction layer the mechanism is not lossy due to the architecture of the link layer: if a packet is not acknowledged it will be resent automatically by the hardware in the interconnect. The possibility for loss and resending at the data link layer however means that the delivery of data packets over the external interconnect is not time-deterministic. Further, all the packets of a given exchange may arrive together or separated apart in time, and in any order, so the external interconnect requires flow control and queuing.

In some embodiments each exchange block 104 may comprise a plurality of exchange block contexts as shown in FIG. 6. Each exchange block context is a piece of hardware logic for implementing a respective instance of the exchange mechanism described above. An exchange block context independently issues exchange-on and off to a subset of tiles configured to listen to that context. In this case an exchange block is a convenient grouping of contexts for physical layout, and for providing a bandwidth in terms of physical bus width to match that offered by the on-chip system-on-chip (SOC) interconnect 34 (the non-deterministic interconnect). By providing multiple contexts per exchange block, and multiple blocks, the external interconnect can process more exchanges in parallel.

In the previously described embodiments, exchanges of data are performed via transfer proxies (i.e. the exchange blocks or contexts). A tile instance 4 communicates only with these transfer/proxies and never directly with the target of the transfer.

External exchange transmission involves the formation and transmission of transaction packets which are used to communicate with the on-chip transfer proxies. Such packets are formed in tile memory 22 by the tile 4, as per any other data structure and transmitted to a transfer proxy using send and/or sendoff instructions (SEND, SENDOFF).

There is no restriction on the number of send instructions used to transmit a single transaction packet. A single send instruction cannot be used to transmit multiple packets. In one implementation the sendoff instruction has an enforced upper limit for the data size of 64 words (256 bytes). An exception event will be raised when attempting to execute a sendoff instruction with a larger payload. Send instructions are subject to flow control and will stall at issue when flow-control is off.

One advantage of the disclosed mechanism is that no DMA engine is necessarily required for the tiles. Instead a (preferably small) subset of the tiles is nominated by the compiler as I/O tiles for sending and/or receiving data off-chip. Because the IPU 2 comprises a high density of small tiles, some number can be allocated to I/O without compromising the performance of the rest of the tiles, thus obviating the argument for a DMA engine. Also, the exchange mechanism is configured to service each of the multiple I/O tiles in turn to ensure that between the tiles the bandwidth of the external link (e.g. PCI or Ethernet) is made good use of, preferably saturated.

While particular embodiments have been described, other applications and variants of the disclosed techniques may become apparent to a person skilled in the art once given the disclosure herein. The scope of the present disclosure is not limited by the described embodiments but only by the accompanying claims.

Features disclosed herein may be used severally or in combination with other features described herein or mentioned below.

According to an aspect there is provided a computer comprising a plurality of interconnected processing nodes arranging in a configuration with multiple stacked layers, each layer comprising three processing nodes connected by respective links between the processing nodes, wherein:
- in end layers of the stack the three processing nodes are interconnected by two links adapted to operate simultaneously;
- in central layers of the stack the three processing nodes are interconnected by single link; and
- processing nodes in each layer are connected to respective corresponding nodes in each adjacent layer by two links adapted to operate simultaneously.

A processing node in the configuration may be programmed to transmit data around three embedded one-dimensional logical rings, each logical ring using a set of processing nodes of this configuration in such a manner that three embedded one-dimensional logical rings operate simultaneously.

The configuration can be utilised to implement the All-reduce collective in a manner as herein described.

According to another aspect there is provided a computer comprising a plurality of interconnected processing nodes arranged in a configuration with multiple stacked layers, each layer comprising four processing nodes connected by respective links between the processing notes, wherein:
- in end layers of the stack, the four processing nodes are interconnected in a ring formation by two links between the nodes, the two links adapted to operate simultaneously;
- processing nodes in the multiple stacked layers provide four faces, each face comprising multiple layers, each layer comprising a pair of processing nodes;
- wherein the processing nodes are programmed to operate a configuration to transmit data around embedded one-dimensional rings, each ring formed by processing nodes in two opposing faces.

Broadly, aspects provide configurations of interconnected processing nodes in which faces of a configuration are formed by stacked layers of pairs of nodes and enable one-dimensional rings to be embedded in the faces. In the ladder configuration there is a single face, in the triangular configurations there are three faces, and in the box structure there are four faces.

Each processing node may comprise memory configured to store an array of data items ready to be exchanged in the reduce scatter phase, wherein each data item is respectively positioned in the array with corresponding data items being respectively positioned at corresponding locations in the arrays of other processing nodes. The array may be a "partial" (a vector of partial results) or a "result" (a vector of fully reduced partials). The processing nodes may each be programmed to transmit data items in a forwards direction to its adjacent processing node in each ring the reduce-scatter phase. The data items which may be transmitted in each step are termed a "fragment". A fragment is piece of the vector—as described herein, vectors are divided into fragments to make use of logical rings formed in the embedded rings.

Each array may represent at least part of a vector of partial deltas, each partial delta representing an adjustment to a value stored at each processing node. Each processing node may be programmed to generate the vector of partial deltas in a compute step. Each processing node may be programmed to divide its vector into two sub arrays for respective utilisation of the two embedded rings.

According to one aspect disclosed herein there is provided a processor comprising an arrangement of multiple tiles on the same chip, each tile comprising its own separate respective processing unit and memory including program memory and data memory, wherein separate portions of program code are arranged to run in parallel in different ones of the tiles. The processor further comprises an on-chip interconnect arranged to enable the code run on the different tiles to communicate between tiles; and an external interconnect comprising a non-time-deterministic mechanism implemented in dedicated hardware logic for communicating data off-chip, whereby data is sent over the external interconnect in the form of packets, each packet having a header in which a destination address is present, and whereby communication of packets over the external interconnect is non-time-deterministic. The external interconnect comprises an external exchange block configured to provide flow control and queuing of the packets. One of the tiles is nominated by a compiler of the code to send an external exchange request message to the exchange block, the external exchange request message comprising one or more control packets indicating which of the tiles have data packets to send to a destination on another chip (the data packets containing content). To perform said flow control, the exchange block is configured to: A) send an exchange-on control packet to a first of the tiles indicated in the exchange request message as having data to send externally, to cause the first tile to start sending packets to their destinations via the external interconnect, being queued in a queue of the exchange block; and then B) once this tile has sent its last data packet, send an exchange-off control packet to this tile to cause it to stop sending packets, and send another exchange-on control packet to the next tile indicated in the exchange request message as having data packets to send (and so forth). I.e. the sending of the exchange-on control packet and the exchange-off control packet is repeated for each tile in turn indicated in the exchange request message, until all the tiles indicated in the exchange request message have sent their respective packets.

Thus, in a given program, the compiler can nominate one or more of the tiles to perform input and/or output (I/O). This may be subset of the tiles on the chip (e.g. one, two or four of the tiles out of tens or hundreds of tiles), but in general any or all of the tiles could be programmed to perform the I/O. In operation, the compiled program on a nominated one of the I/O tiles sends the exchange request message on behalf of the other tiles that are to send data off-chip, telling the exchange block which are those tiles with data to send. Based on this, the exchange block arranges that all the tiles with data to send get serviced in a non-contended schedule. Via the exchange request, the compiled program can demand of the exchange block the right to send data. The exchange request on behalf of a given sending tile lasts indefinitely (until all that tile's current data is sent). However, there are multiple sending tiles all trying to access the same queue of the exchange block. The exchange block thus enforces that the multiple sending tiles are serviced in order, one after another, and thus resolves the contention. In some embodiments the exchange block determines what order the sending tiles are serviced in (though in some embodiments the particular order selected does not matter, as long as they are serviced one after another).

As long as the tiles between them have enough data to send, the described mechanism can always keep the external bandwidth saturated (e.g. the bandwidth of an external connection such as a network or bus between the external interconnect and the destination or destination, via which the packets are sent between the external interconnect and the destination or destination). Even though the exchange may not be efficient at a level of one individual tile, the external exchange request and exchange block see to it that the external connection is kept busy, and preferably that its bandwidth is kept substantially saturated. This means no other special arrangements have to be made to keep the bandwidth saturated.

The data packets are packets that contain content (as opposed to control packets which are used for control signalling).

The external interconnect is so-called because it is for communicating externally. It may be implemented internally on the same chip as the tiles. Alternatively, it could be implemented outside the chip.

The program memory and data memory may be implemented in different addressable memory units. Alternatively, the program memory and data memory may be implemented in different regions of the same addressable memory units. A combination of these approaches may also be used.

In some embodiments the destination of at least some of the packets may be another tile or tiles on another chip. In some embodiments the destination of at least some of the packets may be a host subsystem comprising a host CPU, and said processor may be arranged as a work accelerator to perform work allocated by the host. In further embodiments the destination of at least some of the packets may be a storage device.

The external interconnect is a non-time deterministic interconnect, meaning the communication of packets over the external interconnect is non-time-deterministic. In some embodiments the internal interconnect may be a time-deterministic interconnect, the communication of data between tiles on chip being time-deterministic.

In this case the exchange block, and exchange protocol comprising the exchange-on, exchange-off and exchange request message, advantageously provide a mechanism or "gear box" to bridge the gap between the time-deterministic realm and the non-time-deterministic realm. They allow the time-deterministic realm to request a time deterministic schedule from the non-time-deterministic realm.

In some embodiments, at the physical layer the external interconnect mechanism may be lossy, but at the transaction layer the mechanism may not be lossy due to an architecture whereby, if a packet is not acknowledged, it will be resent automatically by hardware in the external interconnect. Note however that the exchange request mechanism can in fact apply regardless of the cause of the loss, or more generally the cause of the non-time determinism, over the external interconnect. For example, in alternative embodiments the external interconnect mechanism may be lossless at the physical layer but lossy at the transaction layer. In another alternative embodiment the external interconnect may be lossless at the physical and transaction layer, but may be non-time-deterministic because, e.g., the mechanism involves queuing and/or out-of-order transmission. A lossy transaction layer protocol, or a congested lossless interconnect, may also result in non-time deterministic transmission that would benefit from the application of the disclosed mechanism to bridge between the time deterministic and non-time-deterministic realms.

The exchange mechanism can also apply regardless of whether the external link or connection to the destination is lossy (e.g. ethernet) or (as above, reliable, e.g. PCI). In the event of a lossy link, as long as packet loss was detected then the situation can be recovered by re-doing the entire exchange. Thus, the scope of the disclosed techniques can cover the use of both lossy (e.g. ethernet) and reliable (e.g. PCI) external fabrics.

In some embodiments, the exchange block may be configured so as, if at any time the exchange block is unable to continue sending packets over the external interconnect, the exchange block sends an exchange-off control packet to the sending tile before the exchange block's queue overflows; and once the congestion is cleared and the exchange block has sufficient space in its queue it will send an exchange-on control packet to the sending tile allowing it to continue transmitting its content.

The congestion may be due to oversubscription of the interconnect, e.g. by other tiles and/or other exchange blocks (i.e. due to the queue filling up). Alternatively, or additionally, the congestion may be due to previous packet loss and re-transmission in the external interconnect.

In some embodiments, the external interconnect may take the form of a network in which case the header further comprises information for routing purposes.

In some embodiments, the external interconnect may be configured to use clock-data-recovery technology to infer a clock from a received data stream having sufficient data signal transitions to maintain a bit-lock. Alternatively, an explicit clock could be used. E.g. in alternative embodiments, the external interconnect may be configured to use a clock signalled explicitly by the destination or from elsewhere (e.g. a common clock common to both the destination and the external interconnect).

In some embodiments the external interface may be configured to send the packets to the destination or destination via a PCI, PCIe or Ethernet bus or network between the external interface and the destination or destinations. More generally however the disclosed mechanism is not limited to use in conjunction with these particular external protocols and can be used in conjunction with any type of external bus, network or other such connection.

In some embodiments, a group of some or all of the tile modules may be programmed to operate in a series of bulk synchronous parallel, BSP, supersteps, whereby in each superstep the group performs:
  a compute phase in which the tiles in the group performs computations but does not exchange results of the computations outside the chip, and then
  an exchange phase in which at least some of the tiles in the group exchange the results of one or more of the computations with the off-chip destination or destinations, said at least some of the tiles being those indicated in the exchange request; and
  the group is synchronized by a barrier synchronization between each current superstep in the series and the next, whereby each tile in the group waits for all in the group to complete the compute phase of the current superstep before advancing to the exchange phase of the next superstep.

In some embodiments, the on-chip and/or external interconnect may comprise hardware logic configured to conduct said barrier synchronization by:
  receiving a sync request from each of the tiles in the group, and
  issuing a sync acknowledgement on condition that the sync requests are received from all of the group;

wherein each of the tiles in the group is further configured to suspend instruction issue in the respective processing unit the issue of the sync acknowledgment.

In some embodiments, the respective processing unit on each of the tiles may be configured to execute instructions from a predefined instruction set; and wherein the instruction set of some or all of the tiles comprises a sync instruction which causes the tile on which it is executed to send the sync request.

In some embodiments, the exchange block may comprise a plurality of exchange block contexts, each configured to implement an instance of said flow control mechanism for a different respective subset of the tiles.

In some embodiments the processor may comprise at least twenty of said tiles. In some embodiments the processor may comprise at least fifty of said tiles. In some embodiments the processor may comprise at least one hundred of said tiles.

In some embodiments, the processor may be arranged to perform said sending without using a DMA engine, wherein instead a subset of the tiles are nominated by the compiler to act as I/O tiles to perform said sending of data to the off-chip destination and/or to read data from the off-chip destination, said subset being the tiles indicated in the exchange request message. In some embodiments the processor comprises no on-chip DMA engine and is arranged instead to use said nominated I/O tiles. In some embodiments the system comprises no on- or off-chip DMA engine at all.

To transfer data via a processor, the processor has to execute load instructions to load values from memory into its registers, and send instructions to send the values from its registers out to an external port or other such interface. In conventional processors with a single processing unit or small number of cores, this consumes a large amount of the processor's processing cycles executing load and send instructions just to transfer data off-chip. Hence normally it is not desired to burden a processor with this. Instead, a DMA (direct memory access) engine is usually provided on the same chip as the processor. The DMA engine may be programmable or non-programmable. A programmable DMA executes separate code which performs an external transfer on behalf of the processor. A non-programmable DMA engine enables the processor to send a descriptor to the DMA engine specifying a series of external transactions, and the DMA engine will enact the specified transactions without further involvement of the processor. Either way, the processor is thus relieved of some of all of the processing that would otherwise be involved in transferring data off-chip.

However, a transfer performed by the processor itself rather than a DMA engine can actually be faster. Further, in some embodiments of the presently disclosed processor, the processor may in fact comprise a large number of tiles (e.g. ≥20 tiles, ≥50 tiles, or ≥100 tiles). This presents an opportunity to do away with the DMA engine without consuming too much of the processor's resources performing I/O. Instead, the compiler nominates only a subset of the tiles to act as I/O tiles. E.g, this may be, say, only 2 or 4 tiles out of tens, or a hundred or more tiles; or fewer than 1%, 2%, 5% or 10% of the tiles on the chip. Thus, the performance argument for a DMA engine no longer applies.

This scheme can be particularly appropriate in the case of a BSP scheme where it is chosen to serialize compute and exchange. I.e. since most or all of the compute is being separated from the exchange phase anyway, the burden of involving the processor in the off-chip transfer is less of an issue, whilst in the compute phase there will be no exchange anyway so no performance impact on the computation.

In some embodiments, the external interface may be configured to send the packets to the destination or destination via a connection (e.g. said bus or network) between the external interface and the destination or destinations, said link having a first bandwidth for sending the packets; and wherein each of the tiles has a second bandwidth for sending the packets, wherein the number of tiles nominated as I/O tiles may be at least the first bandwidth divided by the second bandwidth rounded up or down to the nearest whole number.

The optimal number of nominated tiles depends on the external I/O bandwidth of one tile compared to the I/O bandwidth of the chip. E.g. in one exemplary implementation, each tile has 32 Gbps bandwidth full duplex, and the chip has 1536 Gbps external SERDES bandwidth. So, on that basis 48 tiles are required to fully subscribe the off-chip bandwidth. In other implementations the numbers may be different, and the optimal number will depend on the bandwidth of the tile versus the external off-chip bandwidth of the chip.

Another advantage is that, in some embodiments, all data movement can be determined by the compiler, which helps with determinism.

According to another aspect there is provided a system comprising the processor and the off-chip destination or destinations of the packets.

According to another aspect there is provided a method of operating the processor or system, the method comprising: running the compiler on a computer in order to compile the code, wherein the compilation comprises the compiler nominating which of the tiles is to send the exchange request message; and running the compiled code on the processor, thereby causing the nominated tile to send the exchange request message to the exchange block to cause the exchange block to perform said queuing and flow control, and causing the tiles indicated in the exchange request message to perform the sending of their packets.

In some embodiments the compilation may comprise the compiler nominating which of the tiles are the I/O tiles.

The invention claimed is:
1. A processor, the processor comprising:
a plurality of processing units on an integrated circuit, the plurality of processing units being interconnected by an exchange comprising a plurality of exchange paths arranged in groups and extending between a first portion of the integrated circuit and a second portion of the integrated circuit, each group comprising at least one first exchange block in the first portion of the integrated circuit and at least one second exchange block in the second portion of the integrated circuit;
a plurality of external interfaces comprising at least one first external interface in the first portion of the integrated circuit and at least one second external interface in the second portion of the integrated circuit;
a routing bus configured to route packets between the external interfaces and the exchange blocks;
wherein the first external interface comprises a host interface for exchanging packets between the integrated circuit and a host connectable to the integrated circuit at the first external interface, and
wherein the second external interface is configured to exchange packets between the integrated circuit and another integrated circuit connectable thereto by the second external interface.

2. The processor of claim 1 configured to implement a routing protocol in which packets sourced by the first exchange block, or exchange blocks, in the first portion of the integrated circuit are routed by the routing bus only to the host interface and not to the second external interface.

3. The processor of claim 1 configured to implement a routing protocol in which packets incoming from a host via the first external interface are routed only to the first exchange block, or exchange blocks, in the first portion of the integrated circuit and not to the second exchange block, or exchange blocks, in the second portion of the integrated circuit.

4. The processor of claim 1 wherein the integrated circuit has a physical configuration in which certain orientations are identified, wherein the first and second portions of the integrated circuit are mapped to the certain orientations.

5. The processor of claim 4 wherein the integrated circuit is one of square and rectangular.

6. The processor of claim 4 wherein a first certain orientation is defined with respect to a first compass point and a second certain orientation is defined with respect to a second compass point, the first portion of the integrated circuit being mapped to the first compass point and the second portion of the integrated circuit being mapped to the second compass point.

7. The processor of claim 1 wherein the exchange comprises an on-chip interconnect which operates to provide communication between processing units on the integrated circuit in a time deterministic fashion.

8. The processor of claim 7 which is configured to cause communication between the exchange blocks and the processing units of the integrated circuit using the on-chip interconnect.

9. The processor of claim 2 which is configured to trap any packet sourced from the second exchange block or blocks which is addressed to the host and indicate that an error has occurred.

10. The processor of claim 3 which is configured to trap any packet which is received from the host and addressed to the second exchange block or blocks and indicate that an error has occurred.

11. The processor of claim 9 comprising at least one link controller associated with at least one of the external interfaces and routing bus, the link controller comprising a routing register for determining that a packet is addressed in error.

12. The processor of claim 1 in which the groups of the exchange paths are arranged in sub-groups, each exchange block comprising a set of exchange block contexts, wherein each exchange block context is configured to direct packets via a sub-group of the group of exchange paths associated with that exchange block.

13. The processor of claim 12 in which each context comprises a logical instance of an exchange block.

14. The processor of claim 1 in which the integrated circuit comprises a third external interface arranged in the second portion of the integrated circuit and configured to connect the integrated circuit to a third external integrated circuit.

15. The processor of claim 14 in which the integrated circuit comprises a fourth external interface in the first portion of the integrated circuit arranged to connect a fourth integrated circuit to the fourth external interface of the integrated circuit.

16. The processor of claim 1 which comprises a physical identifier which identifies a physical context of the processor in a network of interconnected processors.

17. The processor of claim 16 which comprises a logical identifier wherein the logical identifier identifies a logical context of the processor relative to other processors to which it is connected in the network of interconnected processors.

18. The processor of claim 17 comprising a mapping of physical to logical identifiers based on connectivity of the processor to other interconnected processors in a network of interconnected processors, whereby a logical identifier of the processor maps to a unique physical identifier of a connected processor.

19. A network of interconnected processors, the network comprising:
a first processor having a first plurality of processing units on a first integrated circuit, the first plurality of processing units being interconnected by a first plurality of exchange paths extending between a first portion of the first integrated circuit and a second portion of the first integrated circuit;
a plurality of external interfaces comprising at least one first external interface in the first portion of the first integrated circuit and at least one second external interface in the second portion of the first integrated circuit;
wherein the first external interface comprises a host interface for exchanging packets between the first integrated circuit and a host connectable to the first integrated circuit at the first external interface, and
wherein the second external interface is configured to exchange packets between the first integrated circuit and a second integrated circuit connectable thereto by the second external interface; and
a second processor having a second plurality of processing units on the second integrated circuit, the second plurality of processing units being interconnected by a second plurality of exchange paths extending between a third portion of the second integrated circuit and a fourth portion of the second integrated circuit.

20. The network of claim 19, wherein the first processor comprises a physical identifier which identifies a physical context of the first processor in the network of interconnected processors, and a logical identifier which identifies a logical context of the first processor relative to the second processor.

21. The network of claim 20, further comprising a mapping of physical to logical identifiers based on connectivity of the first processor and the second processor, whereby a logical identifier used by the first processors maps to a unique physical identifier of the second processor.

22. The network of claim 19, connected to a host sub-system, wherein the network is configured to act as an accelerator sub-system for the host.

23. A processor, the processor comprising:
a first processing unit on a first integrated circuit,
a second processing unit on the first integrated circuit;
a plurality of exchange paths interconnecting the first processing unit and the second processing unit, the plurality of exchange paths extending between a first portion of the integrated circuit and a second portion of the integrated circuit, the plurality of exchange paths including a first exchange block in the first portion of the integrated circuit and a second exchange block in the second portion of the first integrated circuit;
a first external interface in the first portion of the integrated circuit and a second external interface in the second portion of the first integrated circuit;
a routing bus configured to route packets between the external interfaces and the exchange blocks;

wherein the first external interface includes a host interface configured for exchanging packets between the first integrated circuit and a host, and wherein the second external interface is configured for exchanging packets between the first integrated circuit and a second integrated circuit.

24. The processor of claim 23, in which the integrated circuit comprises a third external interface arranged in the second portion of the integrated circuit and configured to connect the integrated circuit to a third external integrated circuit.

25. The processor of claim 24, in which the integrated circuit comprises a fourth external interface in the first portion of the integrated circuit arranged to connect a fourth integrated circuit to the fourth external interface of the integrated circuit.

26. The processor of claim 23, comprising a physical identifier which identifies a physical context of the processor in a network of interconnected processors.

27. The processor of claim 26, comprising a logical identifier wherein the logical identifier identifies a logical context of the processor relative to other processors to which it is connected in the network of interconnected processors.

28. The processor of claim 27, comprising a mapping of the physical identifier to the logical identifier based on connectivity of the processor to another interconnected processor in the network of interconnected processors, whereby the logical identifier of the processor maps to a unique physical identifier of a connected processor.

\* \* \* \* \*